US007806431B2

(12) United States Patent
Yamada et al.

(10) Patent No.: US 7,806,431 B2
(45) Date of Patent: Oct. 5, 2010

(54) AIRBAG FOR A FRONT PASSENGER'S SEAT

(75) Inventors: Ikuo Yamada, Aichi-ken (JP); Shinichi Ishida, Aichi-ken (JP); Yasushi Okada, Aichi-ken (JP); Tsuyoshi Furuno, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 174 days.

(21) Appl. No.: 12/230,347

(22) Filed: Aug. 28, 2008

(65) Prior Publication Data

US 2009/0058050 A1 Mar. 5, 2009

(30) Foreign Application Priority Data

Aug. 31, 2007 (JP) ............................ 2007-227058

(51) Int. Cl.
*B60R 21/231* (2006.01)
*B60R 21/235* (2006.01)

(52) U.S. Cl. .................... 280/730.1; 280/729; 280/732; 280/743.1

(58) Field of Classification Search ................. 280/729, 280/730.1, 732, 743.1
See application file for complete search history.

(56) References Cited

U.S. PATENT DOCUMENTS 6,834,886 B2 * 12/2004 Hasebe et al. ............ 280/743.1
7,163,229 B2 * 1/2007 Hasebe et al. ............ 280/730.1
7,334,815 B2 * 2/2008 Hasebe et al. ............ 280/743.1
7,455,317 B2 * 11/2008 Bito ........................... 280/732
7,458,605 B2 * 12/2008 Hasebe et al. ............... 280/729
7,648,158 B2 * 1/2010 Hasebe ....................... 280/729
7,654,568 B2 * 2/2010 Yamada .................. 280/743.1

FOREIGN PATENT DOCUMENTS

JP A-2006-103654 4/2006

* cited by examiner

*Primary Examiner*—Ruth Ilan
*Assistant Examiner*—Joseph Rocca
(74) *Attorney, Agent, or Firm*—Posz Law Group, PLC

(57) ABSTRACT

An airbag for a front passenger's seat includes a left outer panel, right outer panel, left inner panel and right inner panel. The left and right outer panels are prepared as laterally symmetrical separate entities. Each of the left and right inner panels includes at the upper front end at full inflation a crossing edge that extends in a transverse direction on the airbag at full inflation. Each of the left and right outer panels includes at the upper periphery a central extended region that includes a joint edge for joint with the crossing edge of each of the inner panels. The central extended regions of the left and right outer panels are coupled together at their circumferences except the joint edges.

7 Claims, 19 Drawing Sheets

AIRBAG FOR A FRONT PASSENGER'S SEAT

The present application claims priority from Japanese Patent Application No. 2007-227058 of Yamada et al., filed on Aug. 31, 2007, the disclosure of which is hereby incorporated into the present application by reference.

BACKGROUND OF THE INVENTION

1. Field of the Invention

The present invention relates to an airbag for a front passenger's seat that is mounted on a top area of an instrument panel of vehicle in front of a front passenger's seat.

2. Description of Related Art

As known in JP 2006-103654, for example, a conventional airbag for a front passenger's seat is stored in a housing on a top area of the instrument panel or dashboard. In operation, fed with inflation gas, the airbag deploys upward and rearward in such a manner as to fill a space between the top plane of the dashboard and a windshield. The airbag is configured to inflate into a generally square conical shape whose front end is the top of the square cone and includes a round gas inlet port for introducing inflation gas in the vicinity of a lateral center of a front end of a lower side of the square cone at inflation. The airbag is attached to the housing at the periphery of the gas inlet port. Further, at full inflation, the airbag includes at a laterally central area at least in a rear region a recess that recesses forward and extends generally vertically, and a pair of raised regions that project rearward relative to the recess on the left and right of the recess and each extend vertically. The tops of the raised regions are formed by outer joints that join peripheral edges of left outer panel and right outer panel that constitute lateral portions of the airbag and corresponding peripheral edges of a pair of left inner panel and right inner panel that are located at an inner area in the lateral direction of the airbag. The leading end of the recess is formed by an inner joint that joins inner peripheral edges of the left and right inner panels together.

In the above airbag, the left inner panel and right inner panel each have a band shape sharply curved in a generally C-shape because those panels form an extensive area from top to rear bottom via rear side except the vicinity of the gas inlet port in the lateral center of the airbag at full inflation. The left outer panel and right outer panel are comprised of a single base cloth that extends from the periphery of the gas inlet port in a laterally symmetric contour approximating a butterfly configuration. These airbag panel configurations have been barriers to improving panel yield and therefore reducing manufacturing cost. Furthermore, upon airbag deployment, stress concentration occurs on an end of the leading end of the recess, i.e. the inner joint that joins the inner peripheral edges of the left and right inner panels together, because the end is located at the vicinity of the gas inlet port, i.e., at the vicinity of the front end of the fully inflated airbag. More specifically, in the initial stage of airbag deployment, a strong tension force acts on the periphery of the gas inlet port in the anteroposterior direction, i.e. in the direction the airbag deploys. Thereafter, when the airbag unfurls laterally, there arises another strong tension force acting in the lateral direction. Therefore, the strong tension forces work on the end of the inner joint located at the vicinity of the gas inlet port in four directions and thereby causing stress concentration. In order to cope with this problem, a separate reinforcing patch or the like has been needed to reinforce the end of the inner joint.

SUMMARY OF THE INVENTION

The object of the present invention is to provide an airbag for a front passenger's seat that is conducive to yield improvement and reduces stress concentration while securing a steady recessed contour of the recess so that it is capable of protecting a passenger smoothly.

The object of the present invention is attained by an airbag having the following structure:

The airbag is folded up and stored in a housing on a top plane of an instrument panel in front of the front passenger's seat for deployment upward and rearward when fed with inflation gas in such a manner as to fill in a space between the top plane of the instrument panel and a windshield disposed above the instrument panel. The airbag has a generally square conical contour at inflation whose front end is the top of the square cone and includes:

a gas inlet port for introducing inflation gas, at the vicinity of a lateral center of a front end of a lower side of the airbag at full inflation;

a peripheral area of the gas inlet port acting as amounting area of the airbag to the housing;

two raised regions disposed side by side at least on a rear side of the airbag at full inflation, each of the raised regions extending generally vertically in such a manner as to rise rearward;

a recess that recesses forward between the raised regions and extends generally vertically;

a pair of left and right outer panels located on laterals of the inflated airbag, the left and right outer panels being configured as laterally symmetric separate entities;

a pair of left and right inner panels located on an inner area in a transverse direction of the inflated airbag, each of the inner panels having a band contour curved in a generally C-shape as is flattened;

a pair of outer joints that join each of outer circumferences of the left inner panel and right inner panel and each corresponding outer circumference of the left outer panel and right outer panel, the outer joints forming tops of the raised regions; and an inner joint that joins inner circumferences of the left inner panel and right inner panel and forms a leading end of the recess.

Each of the inner panels includes at least on one of upper or lower front edges thereof a crossing edge that extends in a transverse direction on the inflated airbag and links the inner joint and outer joints. Each of the outer panels includes, at least at an upper periphery or lower periphery thereof, a central extended region that is located proximate the lateral center of the inflated airbag for joint with the crossing edge of each of the inner panels. Each of the central extended regions includes a joint edge for joint with the crossing edge of each of the inner panels and the central extended regions are coupled to each other at outer circumferences thereof except the joint edges.

In the airbag of the invention, the left and right outer panels that constitute lateral portions of the inflated airbag are laterally symmetrical separate entities. Each of the outer panels includes at least on top or bottom the central extended region that is located proximate the lateral center of the inflated airbag. Each of the central extended regions includes at the rear end the joint edge for joint with the crossing edge of the inner panel. Further, the central extended regions are coupled to each other at the outer circumferences except the joint edges. Conceptually, the outer panels and inner panels of the airbag of the invention have such configurations that a portion of each of left and right inner panels of a conventional airbag is cut out at the location of the crossing edge and then the cut-out portion, i.e. a portion adapted to be located at the front of (above) or at the rear of (below) the crossing edge at airbag inflation, is attached to each of the left and right outer panels as the central extended region. For this reason, the inner panels of the invention have a smaller anteroposterior width in comparison with those of the conventional airbag, with less curvature, in other words, with shallower dents at the inner circumferences. Moreover, since the left and right outer panels are laterally symmetrical separate entities, sizes of respective base cloths for composing the airbag are reduced relative to conventional airbags, which is conducive to yield improvement.

In the airbag of the invention, the inner panels are not simply reduced in the anteroposterior width, but the central extended regions disposed on the outer panels replace or substitute the conceptually cut-out regions of the inner panels in the conventional airbag. This configuration does not reduce the depth of the recess or the rise of the raised regions at the top or bottom region of the airbag where the central extended regions are located. Therefore, the location of the central extended region can be altered to top or bottom of the airbag depending on a type of vehicle or a passenger such that a desired portion of the airbag is deeply recessed to protect the passenger properly coupled with the raised regions.

Moreover, an end of the inner joint that forms the leading end of the recess falls on the crossing edge. This configuration locates the end of the inner joint away from the gas inlet port in a direction the airbag deploys, i.e. in the vertical direction or anteroposterior direction in comparison with a conventional airbag, and therefore, the end of the inner joint is less affected by the tension force that acts on the periphery of the gas inlet port along the deployment direction of the airbag in the initial stage of airbag inflation, thereby preventing a stress concentration on the end of the inner joint. This configuration will lessen or eliminate the need for a separate reinforcing cloth which would otherwise have to be applied on that location.

Therefore, the airbag of the present invention is conducive to yield improvement and reduces stress concentration while securing a steady recessed contour of the recess so that the airbag is capable of protecting a passenger smoothly.

If the central extended regions are located on the top of the left and right outer panels, the airbag inflates with marked rise and recess of the raised regions and recess at the upper end of the rear area. When a passenger bumps against such airbag, the left and right raised regions firstly receive the vicinities of left and right shoulders of the passenger and thereby reducing a forward kinetic energy of the passenger. Then a head of the passenger enters into the recess with the shoulders restrained by the raised regions, and then is arrested and suppressed from moving forward. That is, the airbag receives the passenger's head softly without applying much reaction force in such condition that the kinetic energy of the passenger has been reduced by the raised regions.

Contrarily, if the central extended regions are located on the bottom of the outer panels, the airbag inflates with marked rise and recess of the raised regions and recess at the lower end of the rear area. Accordingly, in the event that such airbag deploys toward a front passenger's seat that is equipped with a child seat mounted facing rearward, a head rest part of the child seat located proximate the dashboard enters in between the recess and the dashboard, so that the inflated airbag is prevented from engaging the child seat as much as possible. In the event that not only a child seat but also other objects are placed proximate the dashboard, too, the airbag is prevented from engaging those objects upon deployment as much as possible.

Furthermore, the central extended regions may be located on both the top and bottom of the left and right outer panels. This configuration will achieve both advantages described above.

It is desired in the above airbag that first ends of the crossing edges of the left and right inner panels located proximate the lateral center of the inflated airbag are displaced to the front or rear relative to second ends of the crossing edges facing away from the lateral center of the inflated airbag and that a crossing joint that joins the crossing edges and the joint edges of the central extended regions of the outer panels together extends and generally in a transverse direction on the inflated airbag in a gently curved continuous manner.

The crossing joint intersects with the inner joint that joins the inner circumferences of the inner panels at the lateral center of the airbag. If each of the crossing edges of the inner panels is configured such that its first end proximate the lateral center of the airbag is displaced to the front or rear in the inflated airbag relative to the second end facing away from the lateral center, the crossing joint is so configured that its lateral center is displaced to the front or rear relative to its left and right ends while extending generally widthwise in a gently curved manner. This configuration helps prevent a lateral tension force that works on intersections of the crossing joint and outer joints upon airbag inflation from directly acting on an intersection of the crossing joint and inner joint, i.e. the end of the inner joint. As a result, the stress applied on the end of the inner joint is further reduced, which will lessen or eliminate the need for a separate reinforcing cloth which would otherwise have to be applied thereto.

If the airbag described above is manufactured of the outer panels and inner panels by sewing work, the inner joint is desirably formed by chain stitch. Since chain stitch is easy to stretch relative to lockstitch that is usually used to manufacture an airbag, the stress applied on the vicinity of the inner joint is alleviated at airbag inflation.

Furthermore, if chain stitch is also used for a seam that sews up upper front peripheries or lower front peripheries of the central extended regions of the outer panels and extends continuously from the inner joint, the stress applied to the vicinity of that seam will be alleviated, too.

BRIEF DESCRIPTIONS OF DRAWINGS

Figure 1:
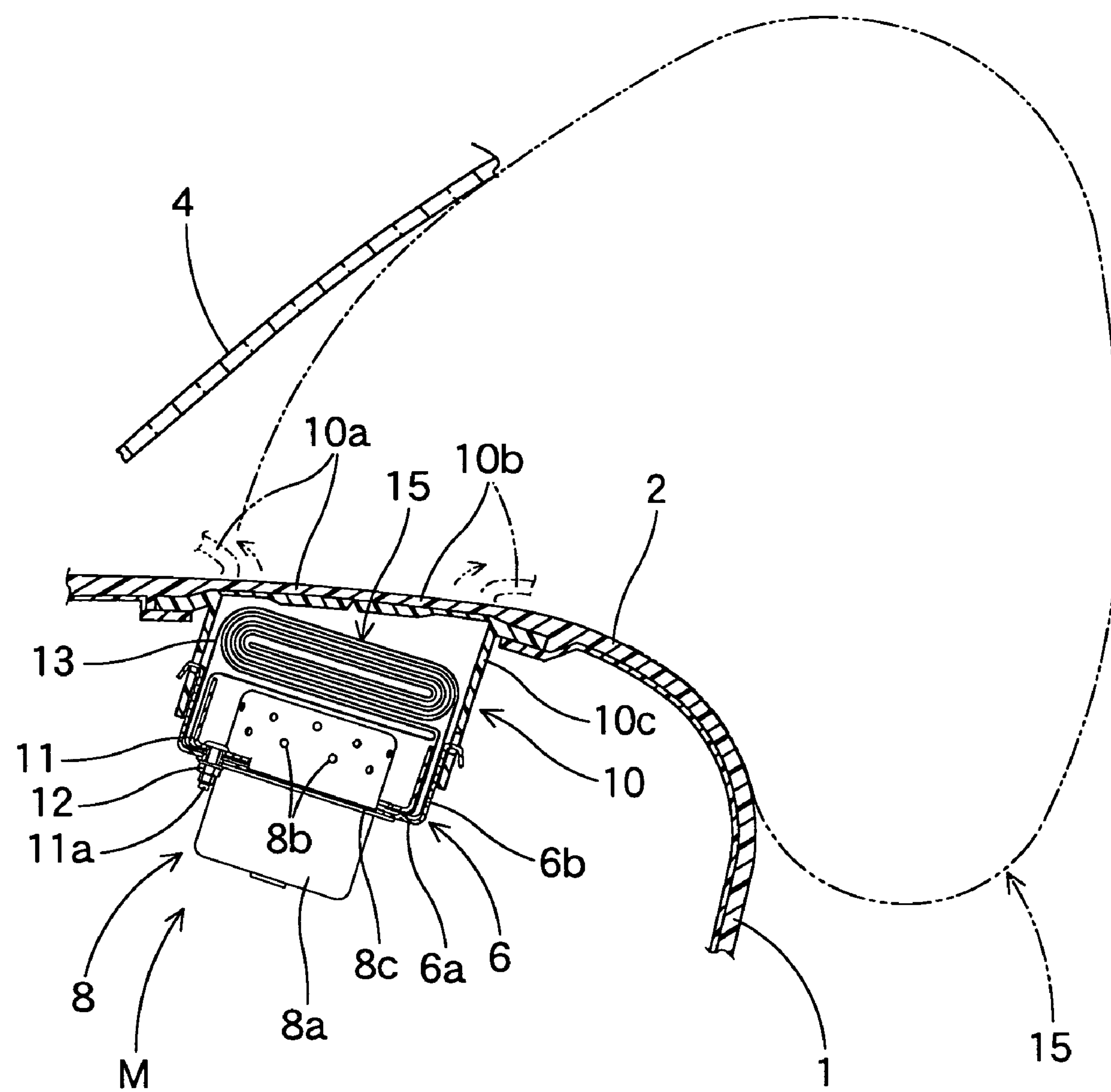
FIG. 1 is a sectional view of an airbag for a front passenger's seat embodying the present invention as used in an airbag apparatus for a front passenger's seat, taken along the anteroposterior direction of a vehicle.
Figure 12:
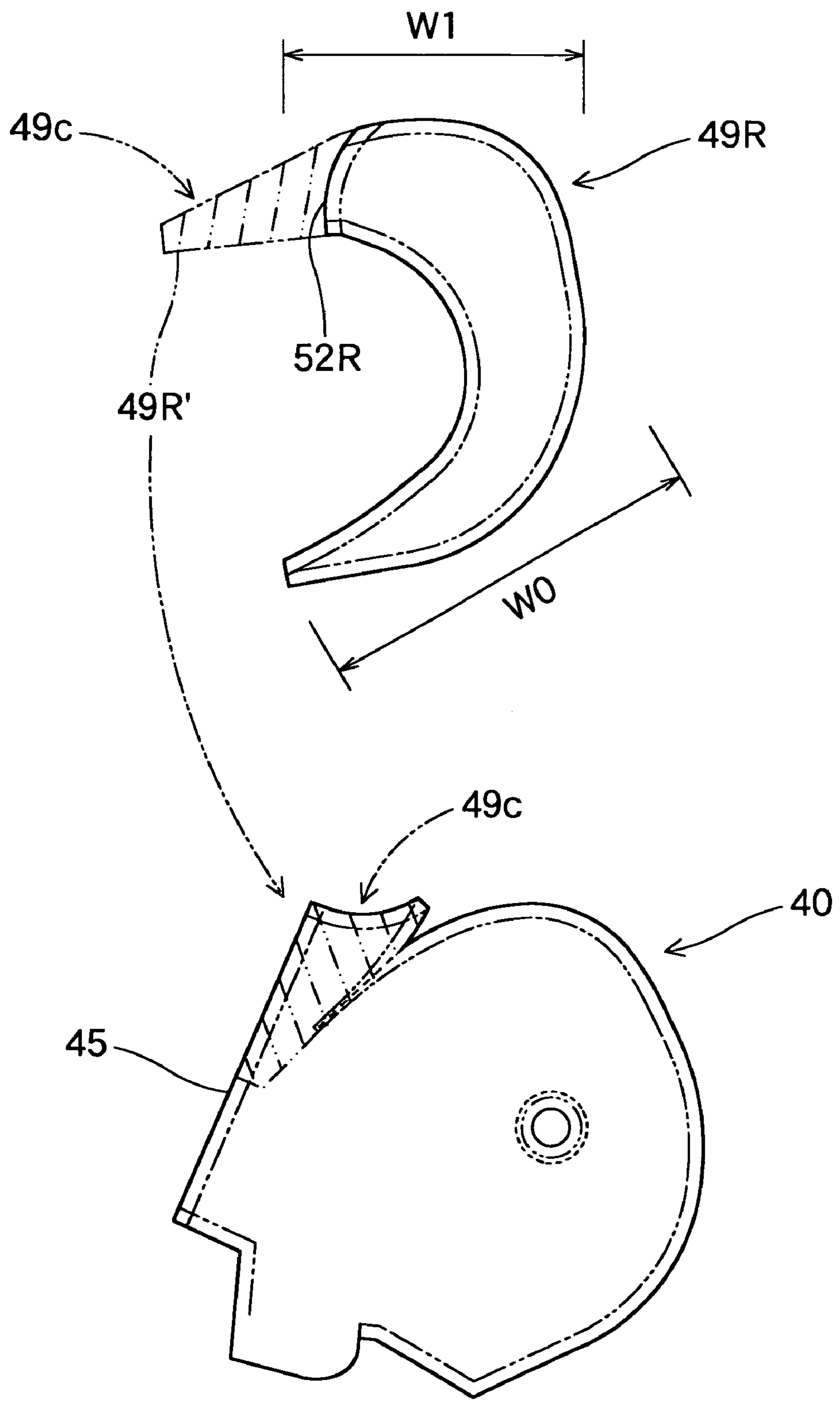
Figure 13:
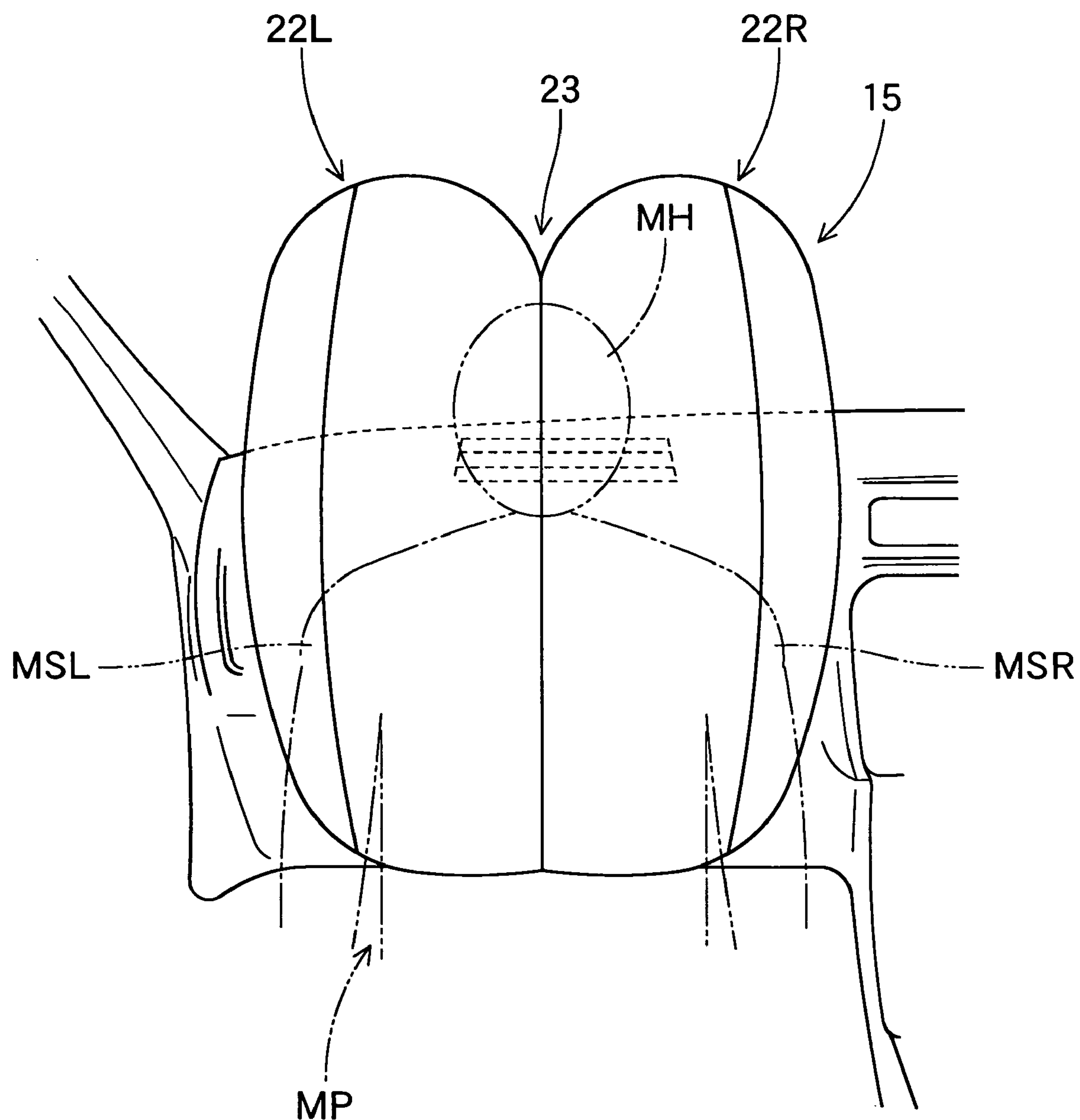
Figure 14:
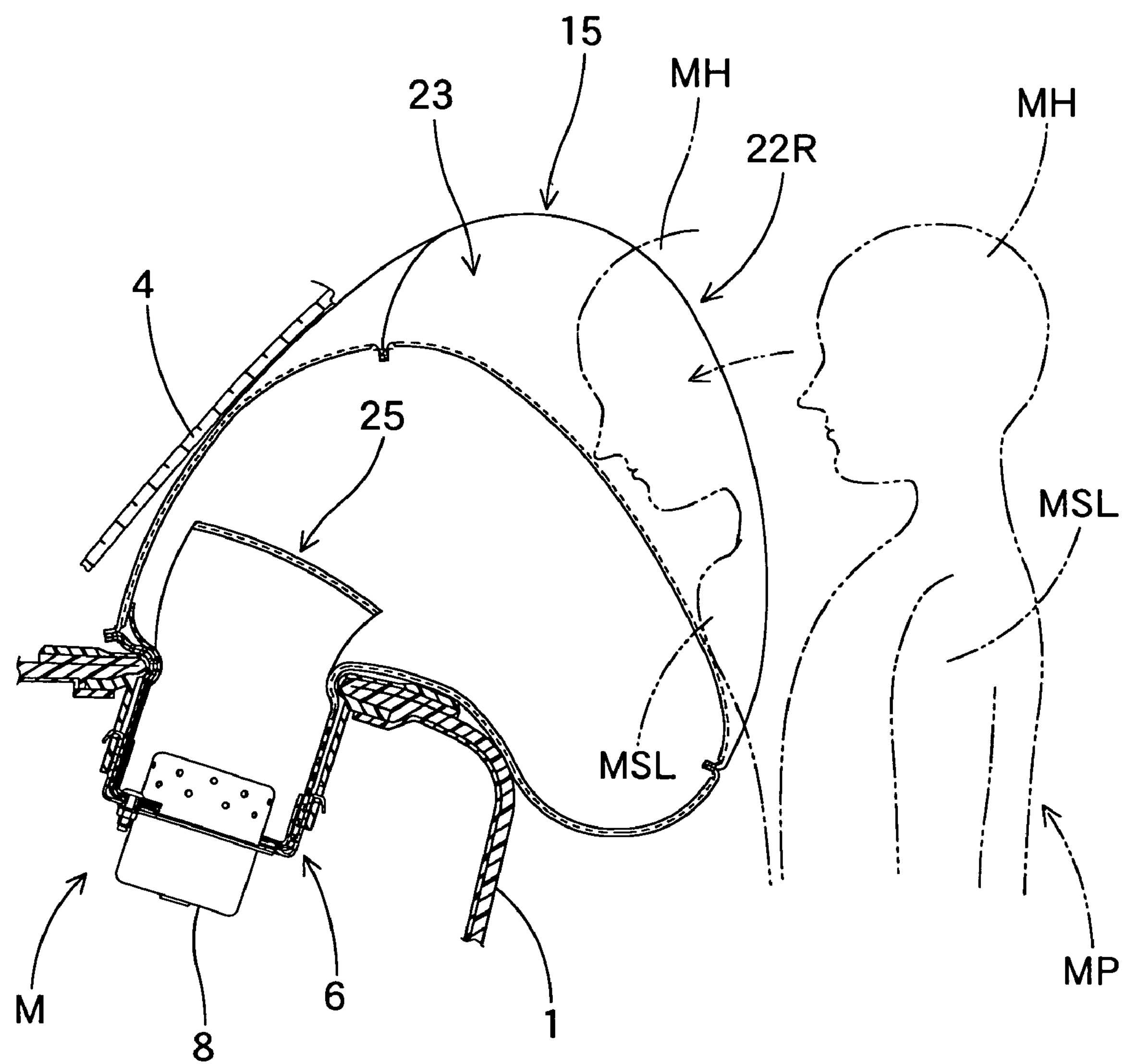
Figure 15:
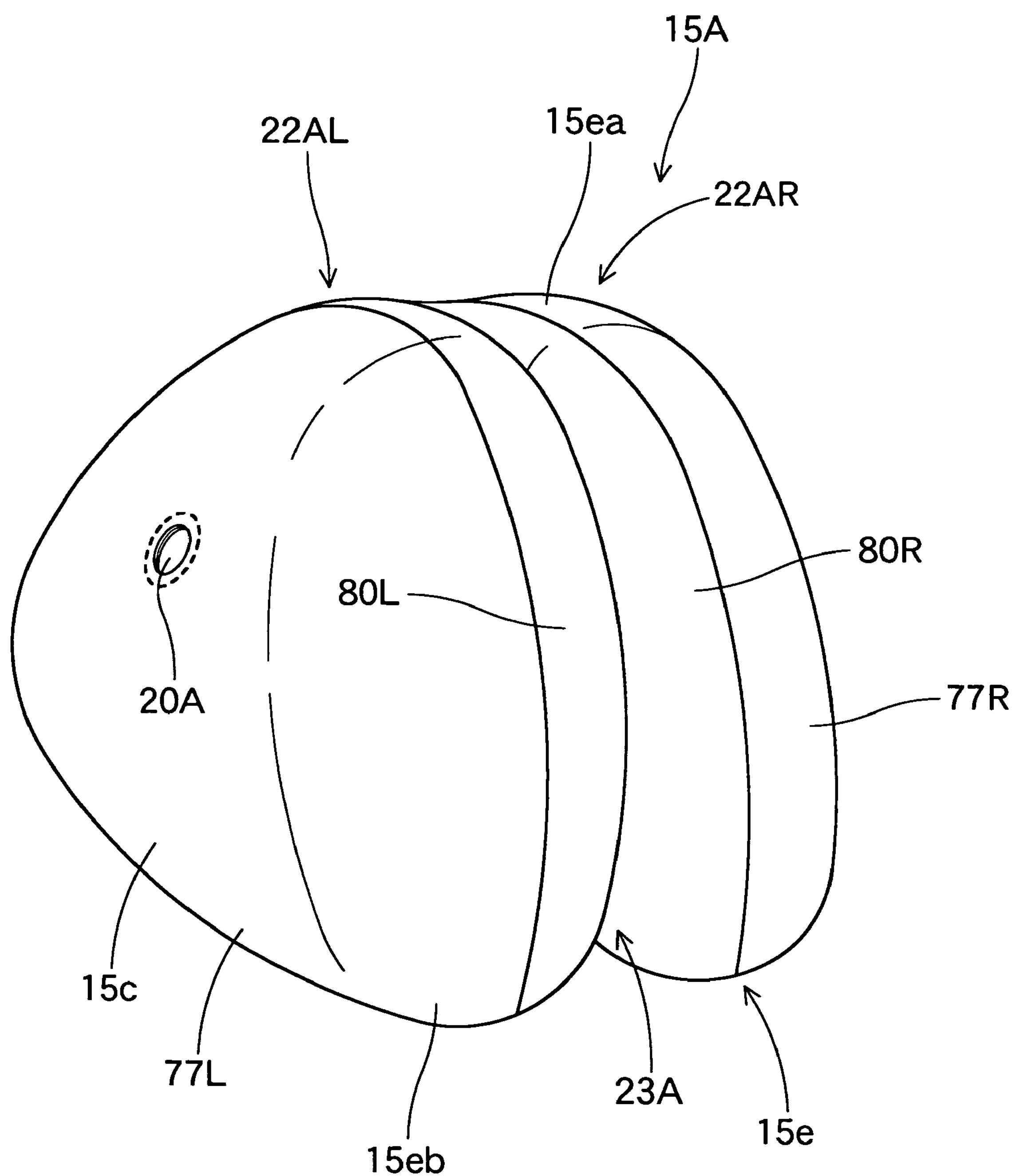
Figure 16:
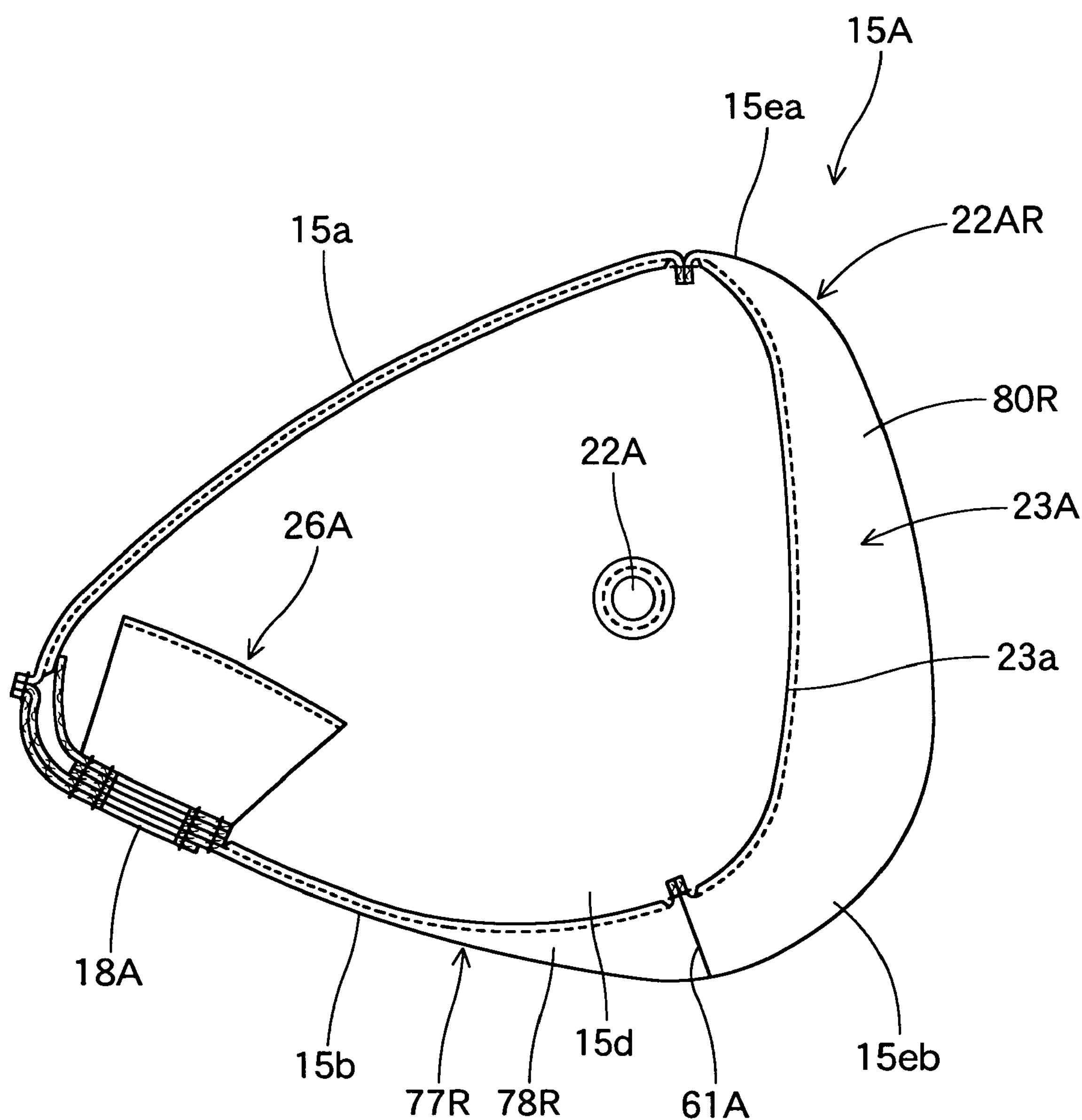
Figure 17:
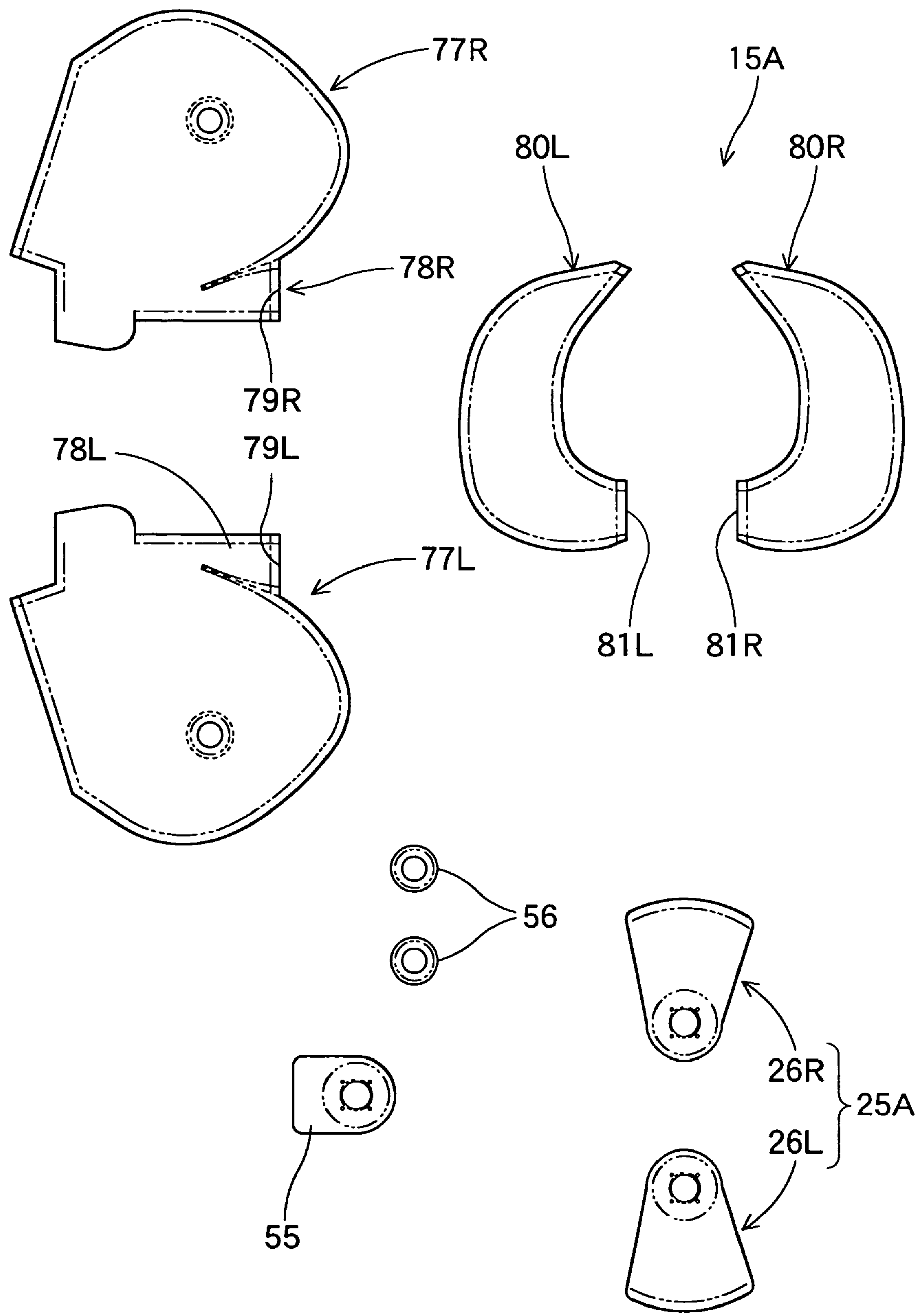
Figure 18:
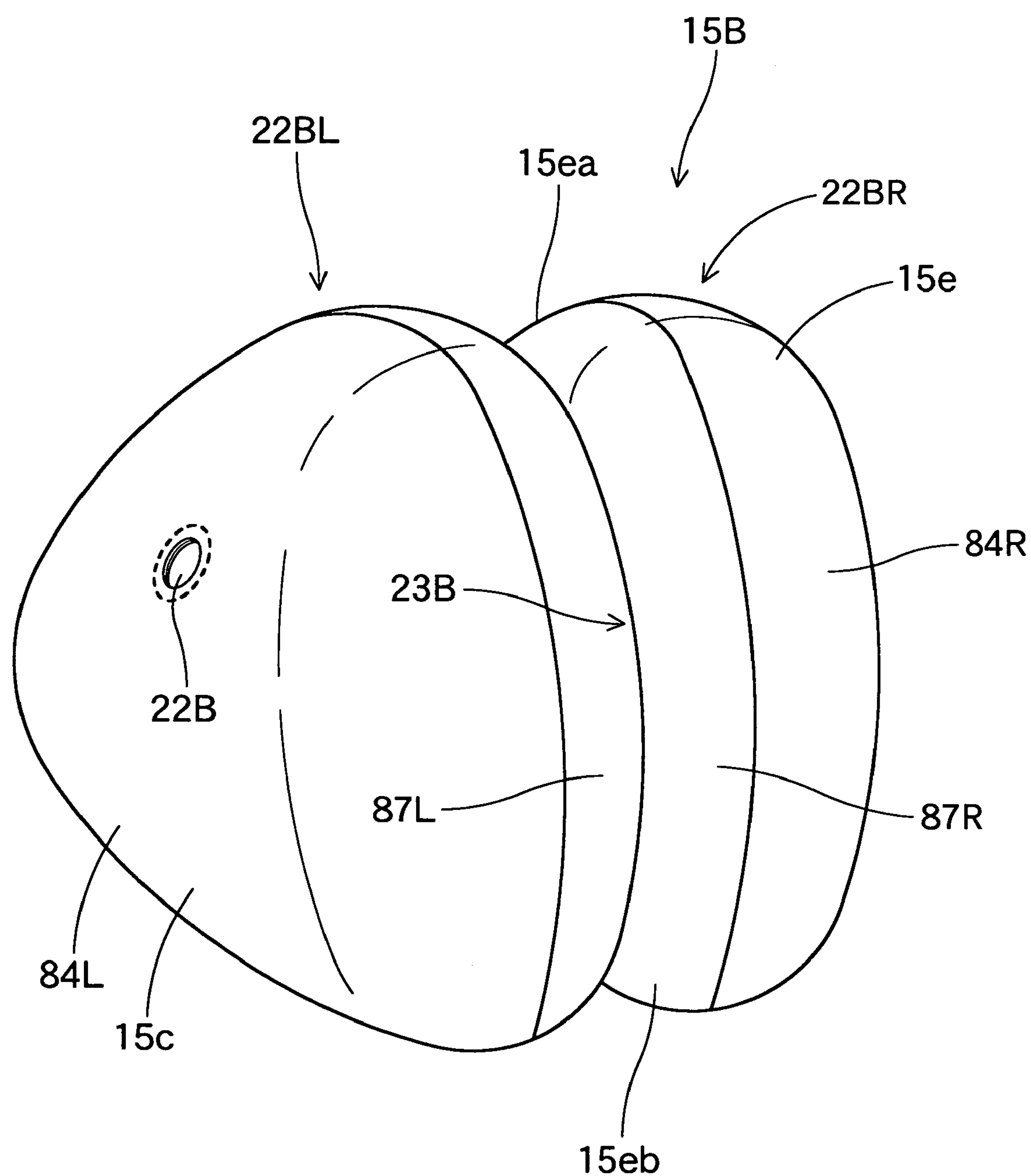
Figure 19:
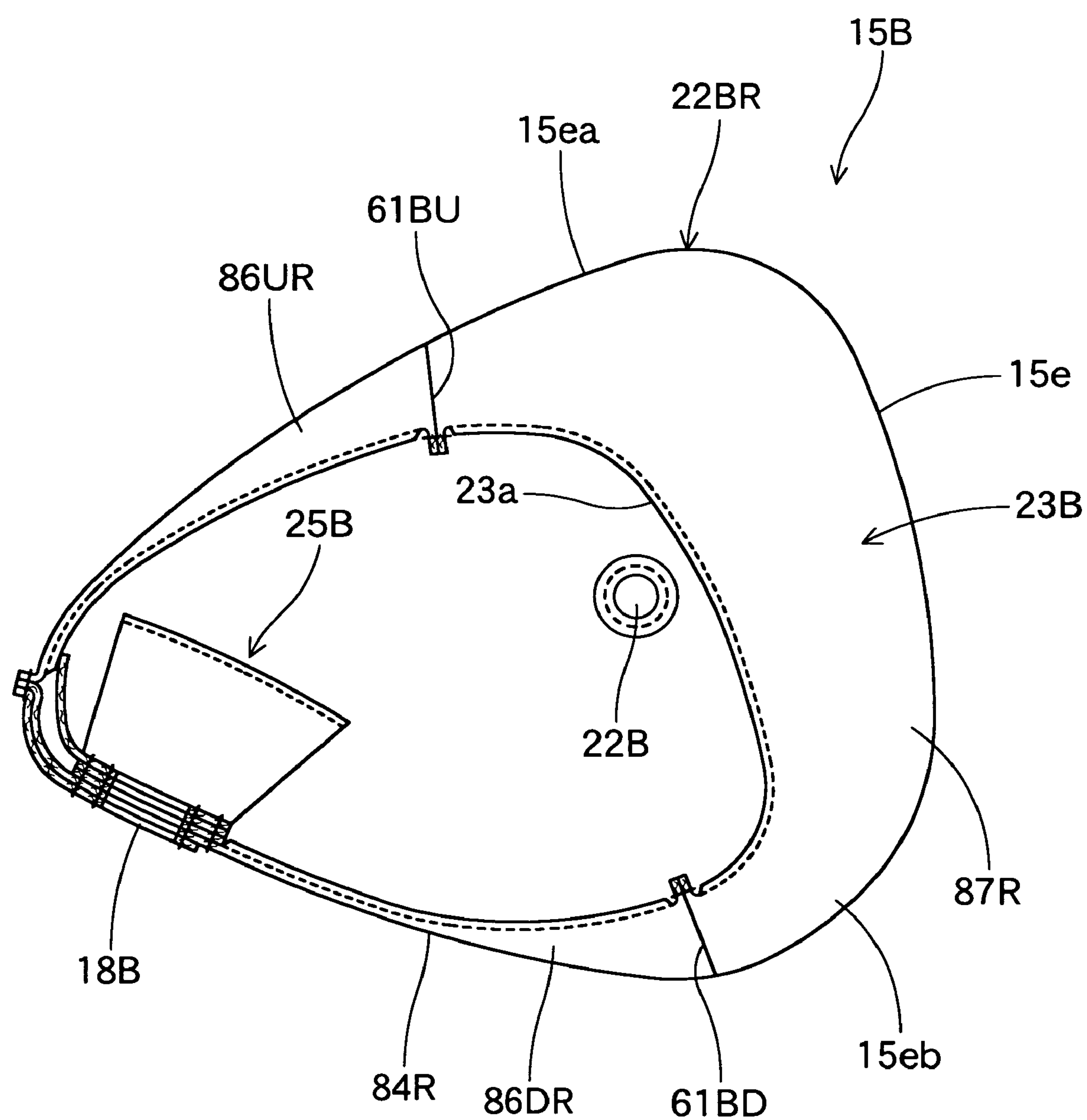
Figure 20:
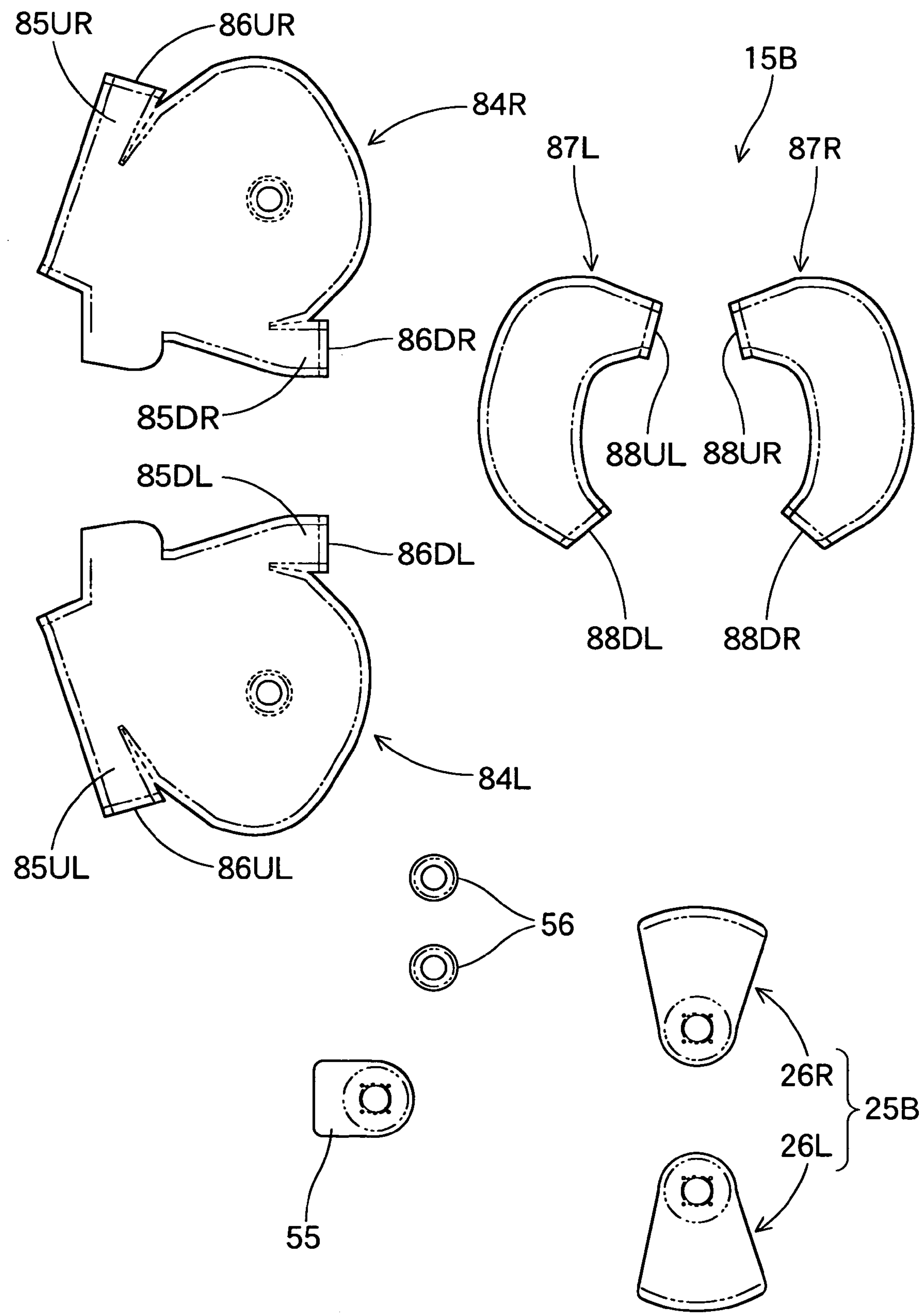

FIGS. 9A, 9B, 10A, 10B, 11A, 11B, 11C, 11D and 11E schematically illustrate the manufacturing process of the airbag of FIG. 1;

FIG. 12 shows plan views of a left outer panel and a left inner panel;

FIG. 13 is a rear view of the airbag of FIG. 1 as fully inflated in operation;

FIG. 14 is a side view of the airbag of FIG. 1 as fully inflated in operation;

FIG. 15 is a rear perspective view of an airbag according to an alternative embodiment as inflated by itself;

FIG. 16 is a sectional view of the airbag of FIG. 15 taken along the anteroposterior direction;

FIG. 17 illustrates base cloths of the airbag of FIG. 15 by plan views;

FIG. 18 is a rear perspective view of an airbag according to a further alternative embodiment as inflated by itself;

FIG. 19 is a sectional view of the airbag of FIG. 18 taken along the anteroposterior direction; and FIG. 20 illustrates base cloths of the airbag of FIG. 18 by plan-views.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

As shown in FIG. 1, an airbag 15 embodying the present invention is used as a component of an airbag apparatus M for a front passenger's seat, which apparatus M is a topmount type that is mounted in an interior of a top plane 2 of dashboard 1. In addition to the airbag 15, the airbag apparatus M includes an inflator 8 for supplying the airbag 15 with inflation gas, a case 6 for housing and holding the airbag 15 and the inflator 8, a retainer 11 for attaching the airbag 15 to the case 6, and an airbag cover 10 for covering the folded-up airbag 15.

Up/down, front/rear, and left/right directions in this specification are intended to refer to up/down, front/rear, and left/right directions of a vehicle being steered straight ahead.

Referring to FIG. 1, the airbag cover 10 is integral with the dashboard 1 that is made from synthetic resin, and includes two doors, i.e. front and rear doors 10*a* and 10*b* that are adapted to open when pushed by the inflating airbag 15 upon airbag deployment. Around the doors 10*a* and 10*b* is a joint wall 10*c* by which the airbag cover 10 is coupled to the case 6.

The inflator 8 includes a generally columnar body 8*a* provided with gas discharge ports 8*b* and a flange 8*c* for attaching the inflator 8 to the case 6.

The case 6 is made of sheet metal into a generally rectangular parallelepiped shape, and has a rectangular opening at the top. The case 6 includes a bottom wall 6*a* having a generally rectangular plate shape to which bottom wall the inflator 8 is attached from below by insertion, and a circumferential wall 6*b* extending upward from an outer peripheral edge of the bottom wall 6*a* for engagement with the joint wall 10*c* of the airbag cover 10. The case 6 is further provided with unillustrated brackets, in the bottom wall 6*a*, to be connected to the vehicle body structure.

The retainer 11 is annular in shape and has bolts 11*a*. The airbag 15 and the inflator 8 are secured to the case 6 by disposing the retainer 11 inside the airbag 15 such that the bolts 11*a* are put through the airbag 15, the bottom wall 6*a* of the case 6 and the flange 8*c* of the inflator 8, and then fastened into nuts 12.

Referring to FIGS. 2 to 7, the airbag 15 is designed to be inflated into a generally square conical contour whose front end is the top of the square cone. The airbag 15 includes an upper side wall 15*a* and a lower side wall 15*b* extending generally along the lateral direction on upper and lower sides, a left side wall 15*c* and a right side wall 15*d* extending generally along the anteroposterior direction on left and right sides, and a rear side wall 15*e* extending generally along the lateral direction to face a passenger in such a manner as to connect the upper side wall 15*a* and lower side wall 15*b*. In this embodiment, the rear side wall 15*e* adapted to face toward a passenger MP upon airbag deployment serves as a passenger protection area. At the vicinity of the lateral center of the front end of the lower side wall 15*b* at full inflation is a round gas inlet port 18 for introducing inflation gas. In a periphery 17 of the inlet port 18 are mounting holes 19 for receiving the bolts 11*a* of the retainer 11 to attach the peripheral region 17 of the port 18 to the bottom wall 6*a* of the case 6. Each of the left side wall 15*c* and right side wall 15*d* of the airbag 15 is provided with a vent hole 20 for releasing extra inflation gas.

Figure 3:
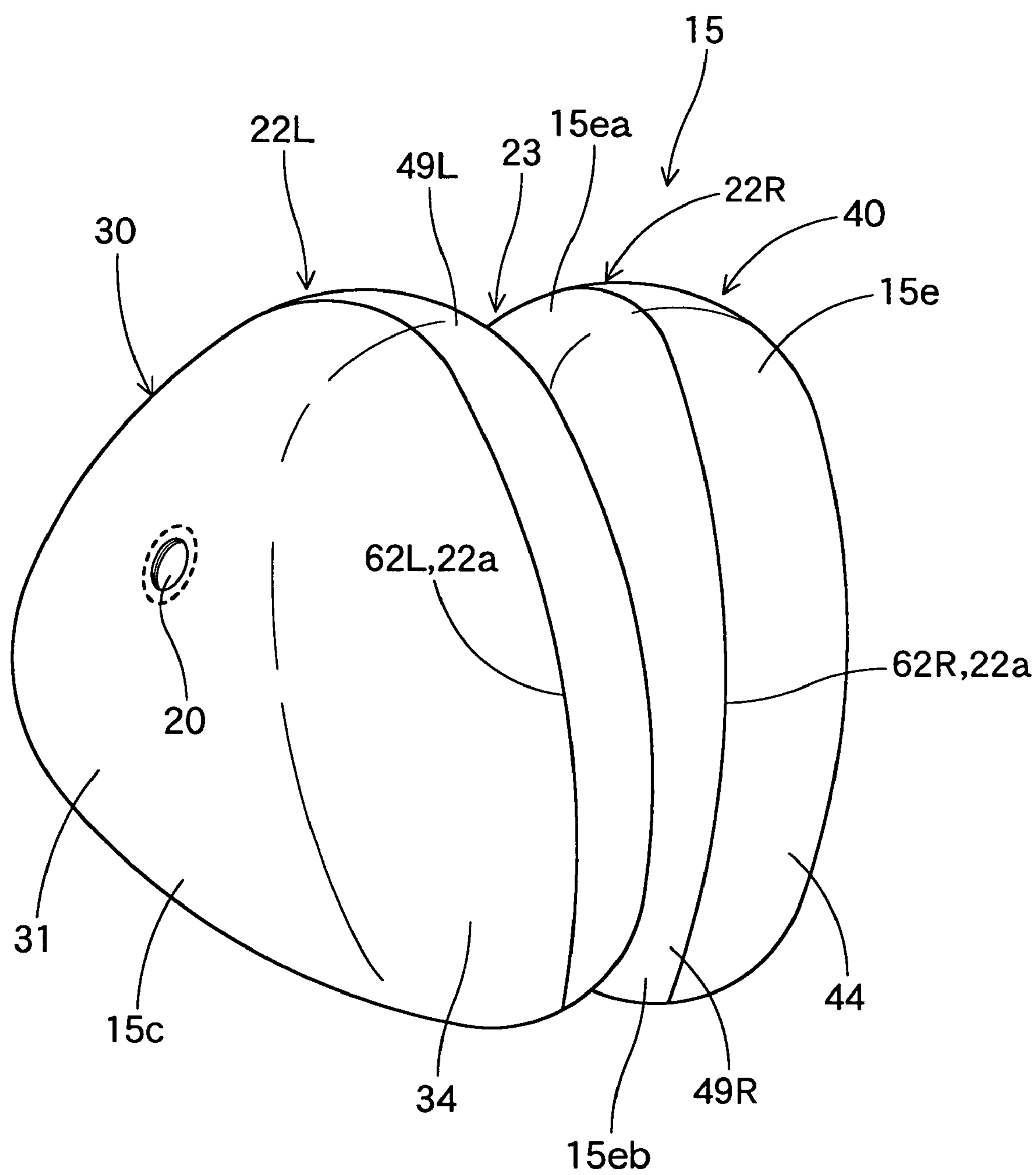
FIG. 3 is a rear perspective view of the airbag of FIG. 1 inflated by itself.
Figure 4:
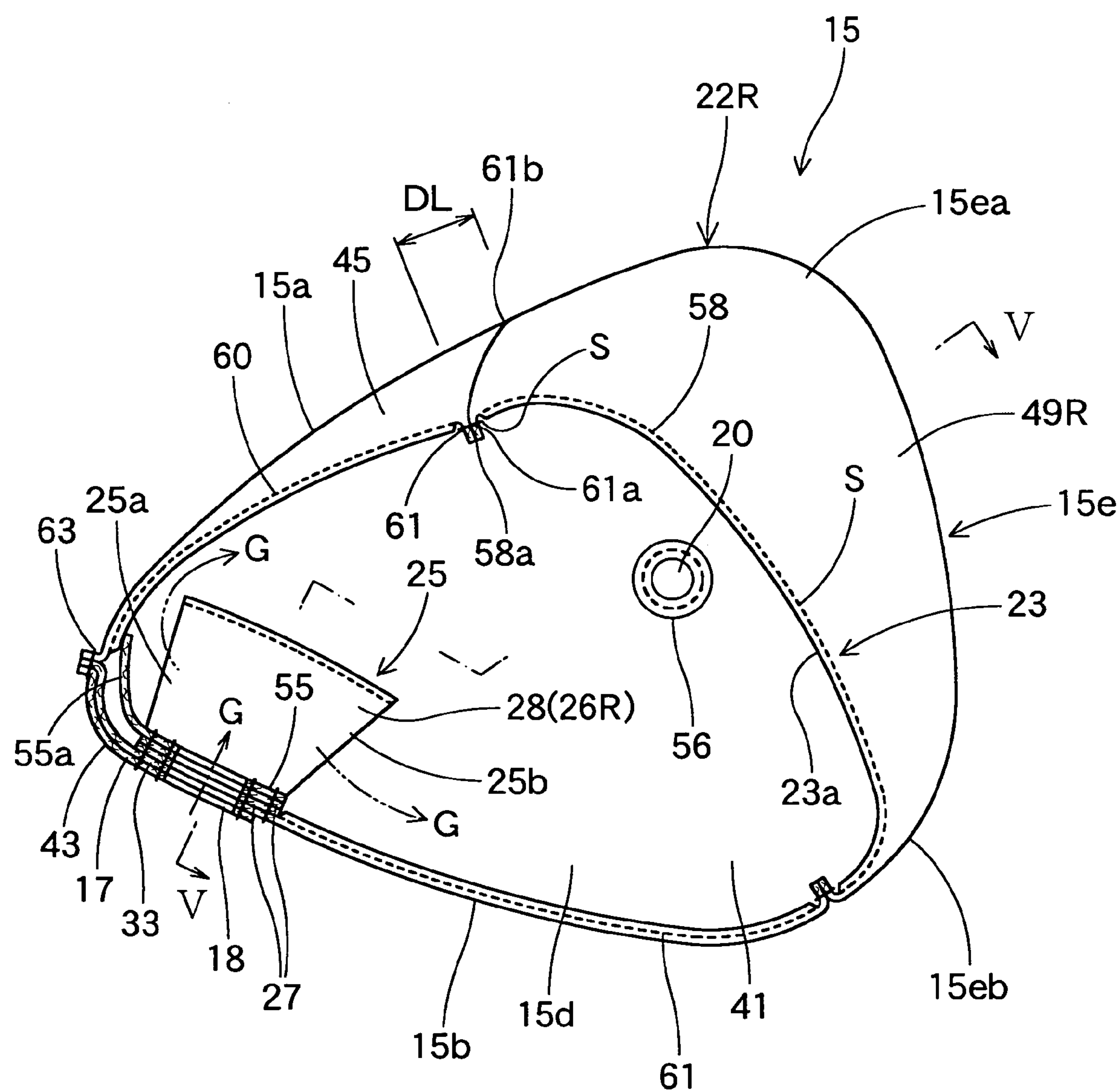
FIG. 4 is a sectional view of the airbag of FIG. 1 inflated by itself, taken along the anteroposterior direction.
Figure 5:
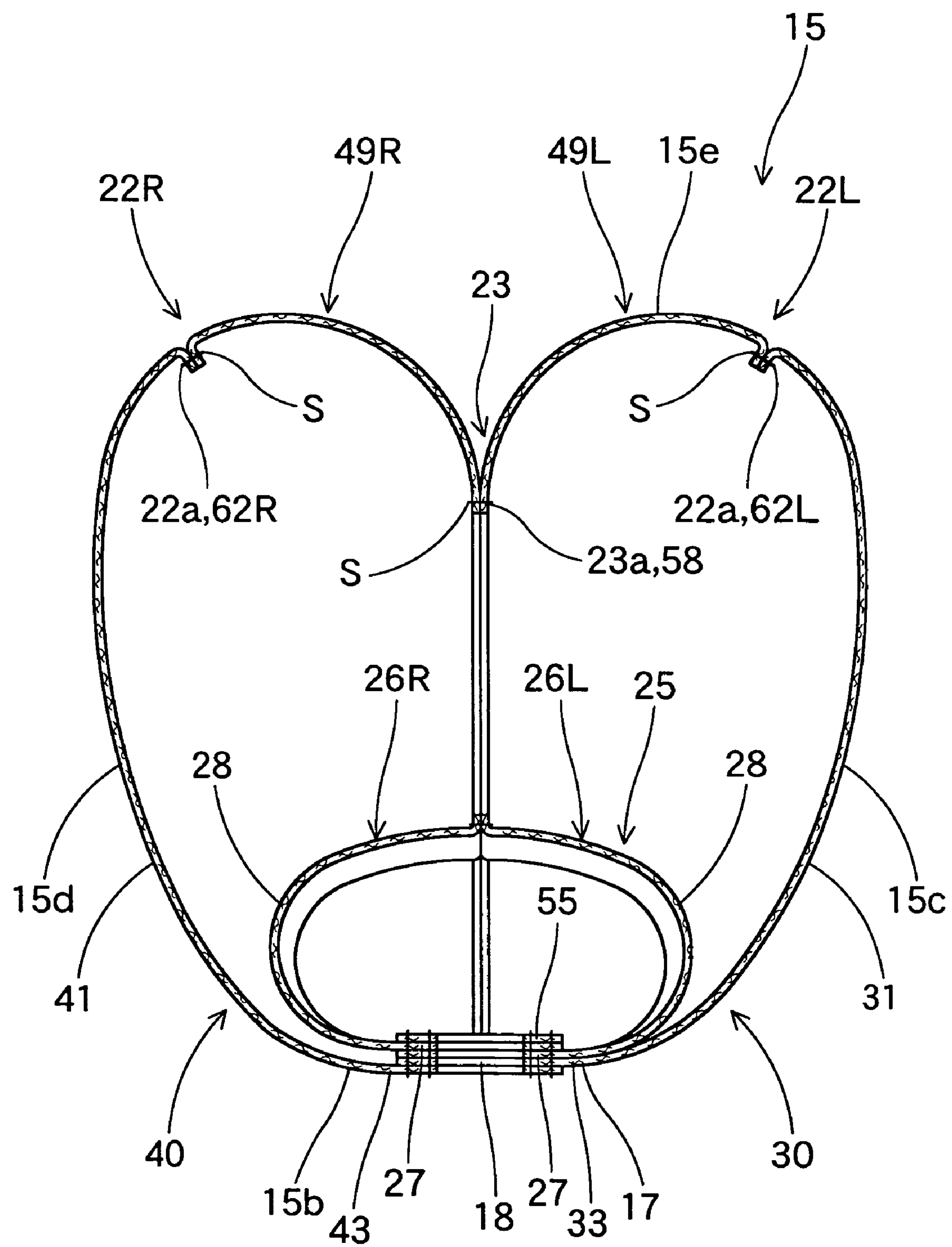
FIG. 5 is a sectional view taken along line V-V of FIG. 4.

As shown in FIGS. 3 to 5, the rear side wall 15*e* adapted to protect a passenger is provided with two raised regions 22L and 22R that are disposed side by side and each extend continuously in the vertical direction in such a manner as to project rearward, and a recess 23 that recesses forward between the raised regions 22L and 22R. The raised regions 22L and 22R are adapted to arrest left and right shoulders MSL and MSR of a passenger MP when he/she contacts the inflated airbag 15 while the recess 23 is adapted to receive and protect passenger's head MH after the shoulders MSL and MSR were arrested by the raised regions 22L and 22R (FIG. 14). In this embodiment, the raised regions 22L and 22R and the recess 23 are disposed over the almost entire vertical area of the rear side wall 15*e*. As shown in FIG. 4, they form the largest unevenness at the top 15*ea* of the rear side wall 15*e* and gradually even out toward the bottom 15*eb* of the rear side wall 15*e* and toward the front end of the upper side wall 15*a* as well. In the airbag 15, the leading end 23*a* of the recess 23 is formed by an inner seam or inner joint 58 that sews up inner circumferential edges 51L and 51R of later-described left inner panel 49L and right inner panel 49R while the tops 22*a* of the raised regions 22L and 22R are formed by outer seams or outer joints 62L and 62R that sew up each of outer circumferential edges 50L and 50R of the left inner panel 49L and right inner panel 49R and each corresponding rear edges 30*c* and 40*c* of later-described left outer panel 30 and right outer panel 40. The airbag 15 of the embodiment is designed to be formed into a laterally symmetrical contour relative to the gas inlet port 18 at full inflation.

Referring to FIGS. 4 and 5, the airbag 15 is internally provided with a flow regulating cloth 25. The flow regulating cloth 25 is disposed over the gas inlet port 18 and has a generally cylindrical shape opened at the front and rear ends so as to redirect inflation gas G fed via the inlet port 18 forward and rearward. That is, as shown in FIG. 4, inflation gas G fed via the inlet port 18 is supplied into the airbag 15 from front and rear openings 25*a* and 25*b* of the flow regulating cloth 25.

Figure 8:
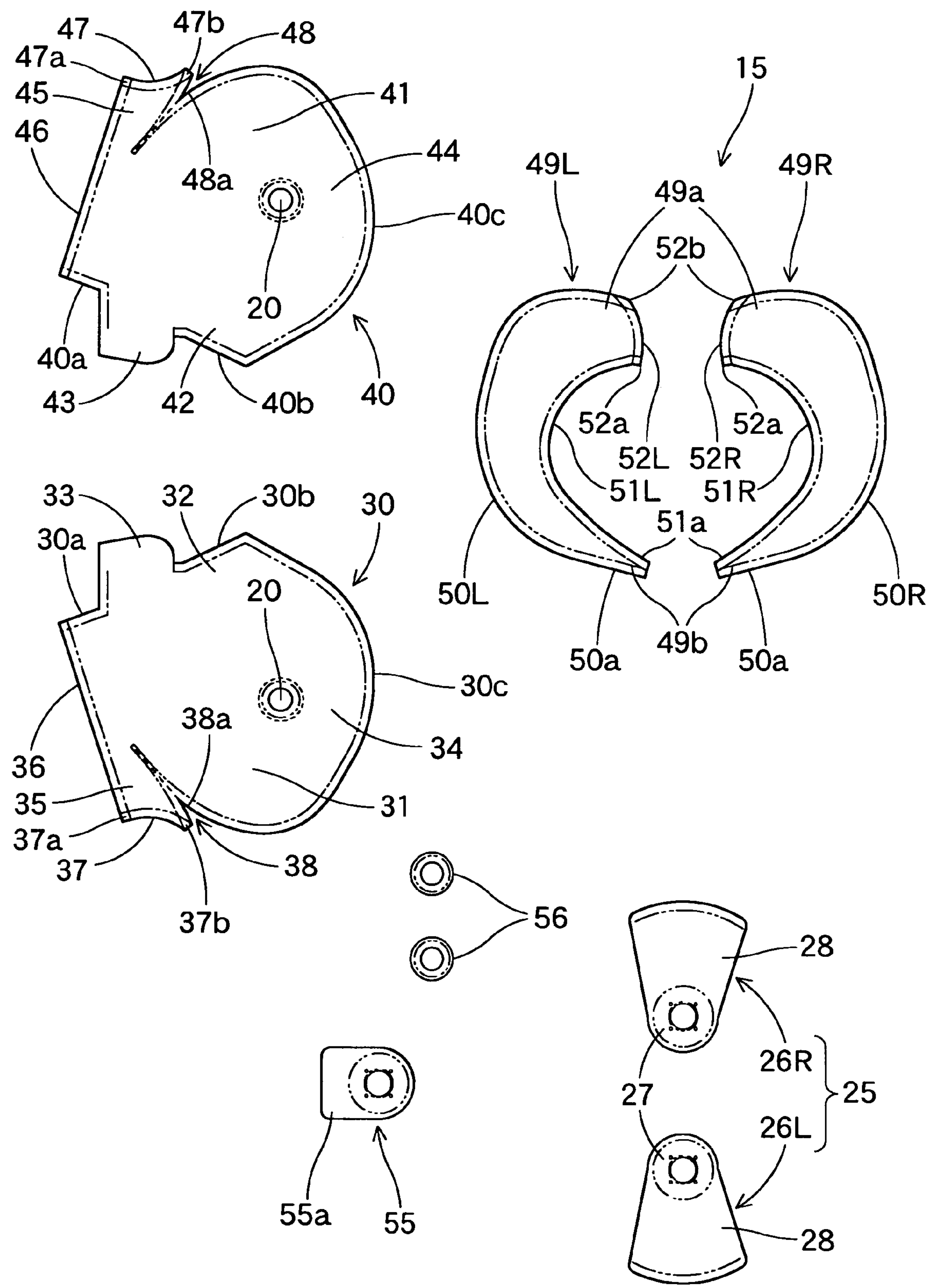
FIG. 8 illustrates base cloths of the airbag of FIG. 1 by plan views.

The flow regulating cloth 25 of this embodiment is made of materials 26L and 26R shown in FIG. 8. The materials 26L and 26R have laterally symmetric contours. Each of the materials 26L and 26R includes a joint portion 27 that constitutes a peripheral area 17 of the gas inlet port 18 and a main body 28 extending toward the left or right from the joint portion 27. Each of the joint portions 27 includes openings (reference numerals omitted) correspondent to the inlet port 18 and mounting holes 19. In this embodiment, the flow regulating cloth 25 is formed by superimposing the joint portions 27 of materials 26L and 26R one on the other so that the openings of the respective materials match one another, sewing the joint portions 27 to later-described left outer panel 30 and right outer panel 40 together with a later-described reinforcing cloth 55 at entire peripheral edges of the joint portion 27, and then by sewing up ends of the main bodies 28.

The airbag 15 is made by joining peripheral edges of four pieces of predetermined shaped base cloths: a left outer panel 30 and a right outer panel 40 that are adapted to be located outside in the lateral direction of the fully inflated airbag 15, and a left inner panel 49L and a right inner panel 49R that are adapted to be located on an inner area in the transverse direction of the inflated airbag 15 (FIG. 8).

The left outer panel 30 and right outer panel 40 constitute laterals of the fully inflated airbag 15. In this embodiment, the left outer panel 30 and right outer panel 40 are prepared as such separate entities as to split areas located widthwise outside relative to the tops 22*a* of the raised regions 22L and 22R out of the areas of the upper side wall 15*a*, lower side wall 15*b*, left side wall 15*c*, right side wall 15*d* and rear side wall 15*e*. The panels 30 and 40 have laterally symmetrical contours that bulge rearward at the rear edges 30*c* and 40*c*. Each of the panels 30 and 40 has a generally sectorial contour that widens toward the rear.

Referring to FIG. 8, the left outer panel 30 has a left region 31 for forming the left side wall 15*c* generally at the vertical center, a lower left region 32 for forming a left area of the lower side wall 15*b* on the lower side and a generally semicircular projecting region 33 for forming the periphery 17 of the gas inlet port 18, at the front end and below the lower left region 32. A rearward area ranging from the left region 31 to the lower left region 32 constitutes a rear left region 34 adapted to be located on the left side relative to the top 22*a* of the raised region 22L in the rear side wall 15*e*. The left outer panel 30 further includes on the upper side a central extended region 35 that extends toward the lateral center from the left region 31 or left side wall 15*c* and forms a left area of the upper side wall 15*a* in the fully inflated airbag 15. The central extended region 35 is formed into a generally triangle that is connected with the left region 31 at the front lower end and partially projects from the left region 31. The central extended region 35 constitutes an area from the top 22*a* of the raised region 22L to the leading end 23*a* of the recess 23 in the inflated airbag 15 while being continuous with the left inner panel 49L. To this end, a dart 38 is formed between the central extended region 35 and the left region 31 so the raised region 22L and the recess 23 smoothly continue in contour between the left inner panel 49L and the central extended region 35. More specifically, a slit 38*a*, which is to make the dart 38, is formed between the left region 31 and a rear upper edge 37 acting as a joint edge for joint with a later-described crossing edge 52L of the left inner panel 49L so that the central extended region 35 is separated from the left region 31 at the rear top. The rear upper edge 37 of the central extended region 35 is gently curved to correspond to the crossing edge 52L of the left inner panel 49L such that a middle end 37*a* proximate a front upper edge 36 that is adapted to be located on the lateral center in the inflated airbag 15 is positioned forward in the inflated airbag 15 relative to a side end 37*b* proximate the slit 38*a* that is adapted to be located toward the left end of the inflated airbag 15.

The right outer panel 40 is configured laterally symmetrical to the left outer panel 30. As shown in FIG. 8, it has a right region 41 for forming the right side wall 15*d* generally at the vertical center, a lower right region 42 for forming a right area of the lower side wall 15*b* on the lower side and a generally semicircular projecting region 43 for forming the periphery 17 of the gas inlet port 18, at the front end and below the lower right region 42. In the right outer panel 40, too, a rearward area ranging from the right region 41 to the lower right region 42 constitutes a rear right region 44 adapted to be located on the right side relative to the top 22*a* of the raised region 22R in the rear side wall 15*e*. The right outer panel 40 further includes on the upper side a central extended region 45 that extends toward the lateral center from the right region 41 or right side wall 15*d* and forms a right area of the upper side wall 15*a* in the fully inflated airbag 15. The central extended region 45 is configured identical to the central extended region 35 of the left outer panel 30. The central extended region 45 also constitutes an area from the top 22*a* of the raised region 22R to the leading end 23*a* of the recess 23 in the inflated airbag 15 while being continuous with the right inner panel 49R. To this end, a dart 48 is formed between the central extended region 45 and the right region 41 so the raised region 22R and the recess 23 smoothly continue in contour between the right inner panel 49R and the central extended region 45. More specifically, a slit 48*a*, which is to make the dart 48, is formed between the right region 41 and a rear upper edge 47 acting as a joint edge for joint with a later-described crossing edge 52R of the right inner panel 49R. Like the central extended region 35 of the left outer panel 30, the rear upper edge 47 of the central extended region 45 is gently curved to correspond to the crossing edge 52R of the right inner panel 49R such that a middle end 47*a* proximate a front upper edge 46 that is adapted to be located on the lateral center in the inflated airbag 15 is positioned forward in the inflated airbag 15 relative to a side end 47*b* proximate the slit 48*a* that is adapted to be located toward the right end of the inflated airbag 15.

Figure 2:
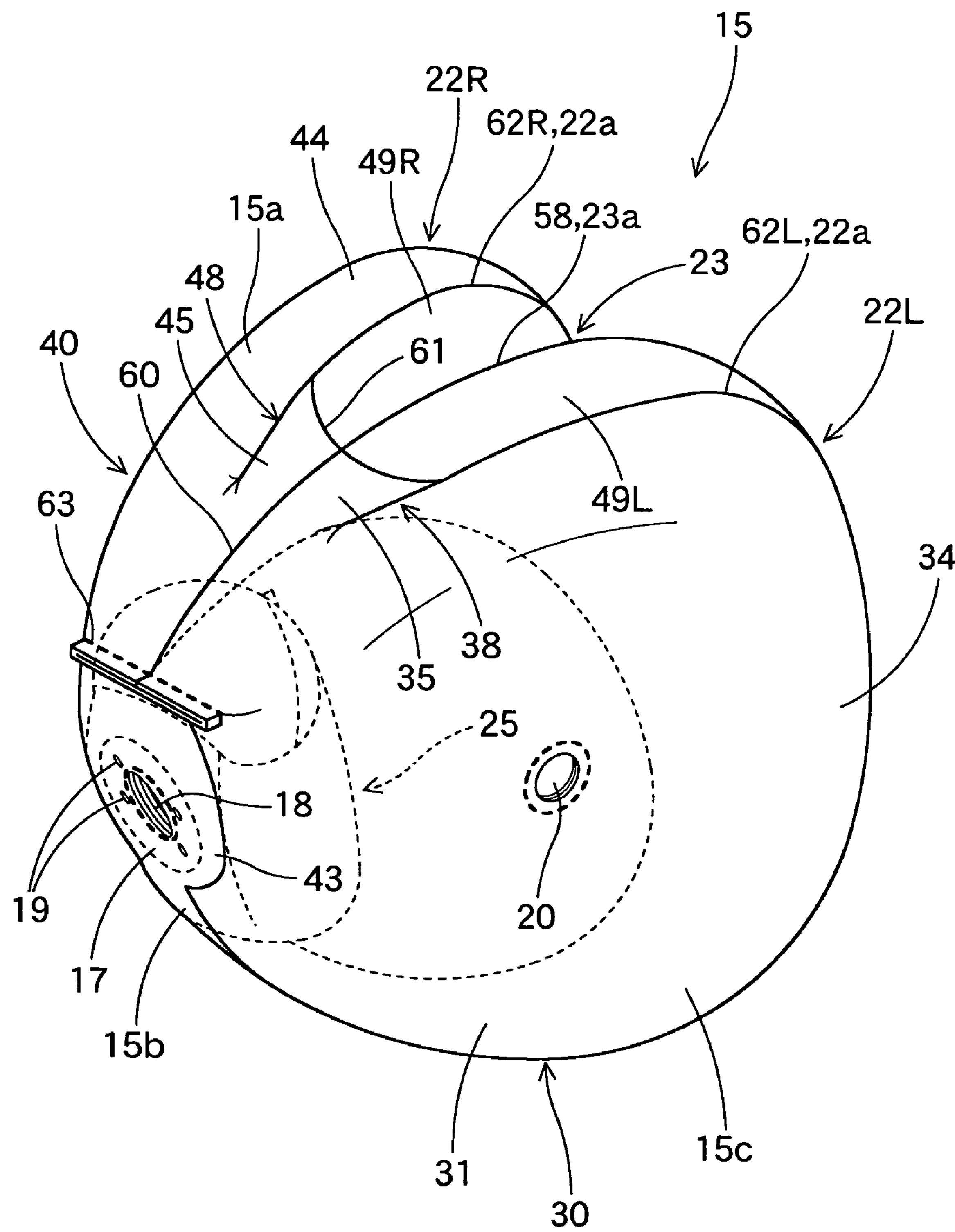
FIG. 2 is a front perspective view of the airbag of FIG. 1 inflated by itself.
Figure 6:
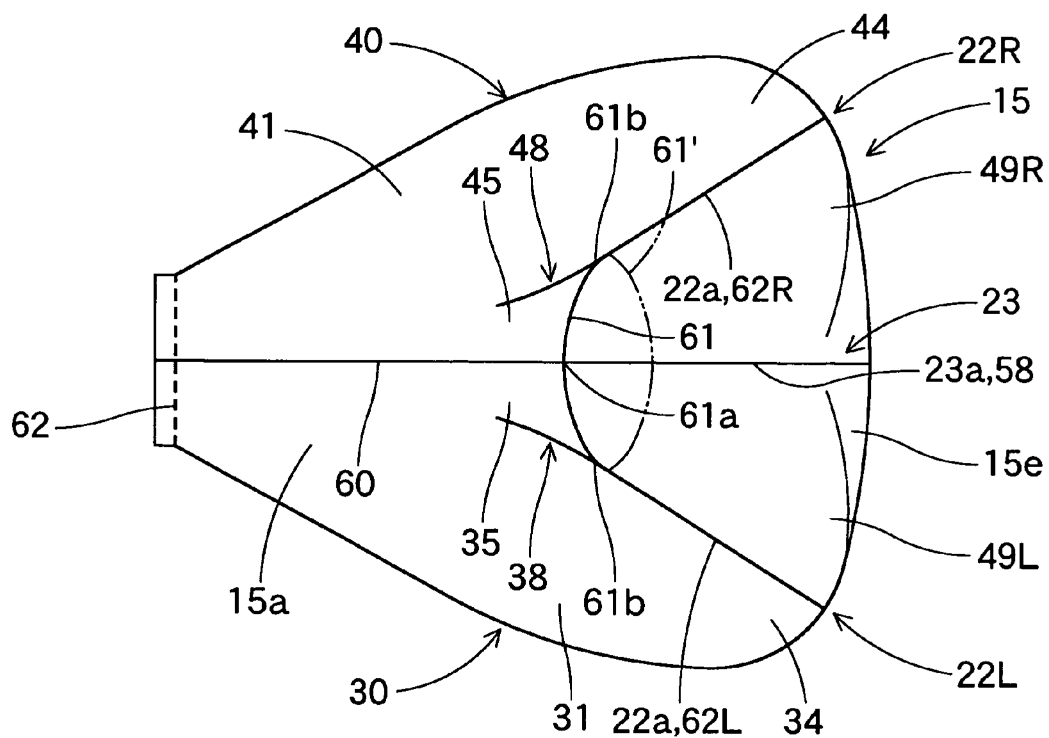
FIG. 6 is a plan view of the airbag of FIG. 1 inflated by itself.
Figure 7:
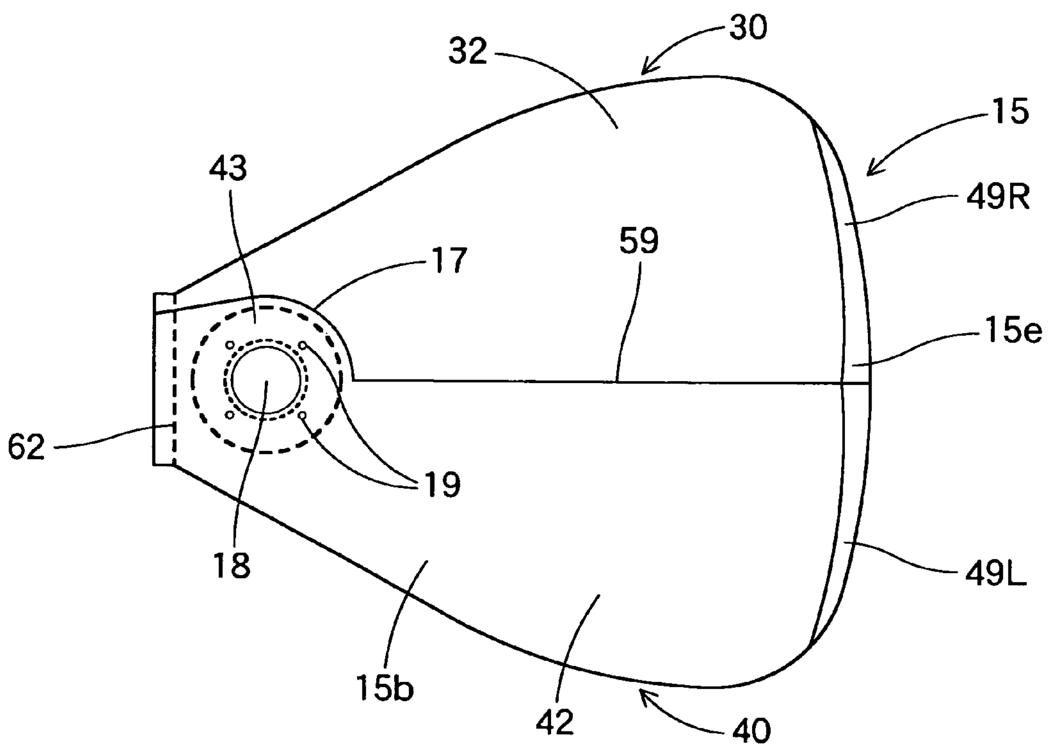
FIG. 7 is a bottom view of the airbag of FIG. 1 inflated by itself.

As shown in FIG. 8, the left inner panel 49L and right inner panel 49R are a pair of bands curved in generally C-shape. The panels 49R and 49L are adapted to be located on an inner side in the lateral direction of the inflated airbag 15 in such a manner as to split an area from the tops 22*a* of the raised regions 22L and 22R to the leading end 23*a* of the recess 23 in the rear side wall 15*e*. In this embodiment, each of the left inner panel 49L and right inner panel 49R has a band-shape with the outer edge 50L/50R and inner edge 51L/51R curving rearward in a projecting manner. More specifically, each of the panels 49L and 49R has such a tapered end, at the lower front edge 49*b*, that the lower end 50*a* of the outer edge 50L/50R and the lower end 51*a* of the inner edge 51L/51R converge while having a wide end, at the upper front edge 49*a*, with a crossing edge 52L/52R that crosses with the outer edge 50L/50R and inner edge 51L/51R. The crossing edges 52L and 52R are adapted to extend generally widthwise on the inflated airbag 15. Each of the crossing edges 52L and 52R is gently curved in an arcuate fashion such that a middle end 52*a* on the side of the inner edge 51L/51R that is adapted to be located on the lateral center of the inflated airbag 15 is positioned forward on the inflated airbag 15 relative to a side end 52*b* on the side of the outer edge 50L/50R that is adapted to be located to the side of the inflated airbag 15. The crossing edges 52L and 52R are sewn up with the rear upper edges 37 and 47 of the central extended regions 35 and 45 in the left outer panel 30 and right outer panel 40 and provide a crossing seam 61 as shown in FIGS. 2, 4 and 6. The crossing seam 61 has such a gently curved continuous contour that its lateral center 61*a* is located forward relative to left and right ends 61*b* while extending widthwise on the inflated airbag 15. Further, the outer edges 50L and 50R of the inner panels 49L and 49R as flattened are configured to match with the curves of the rear edges 30*c* and 40*c* of the outer panels 30 and 40.

The airbag 15 of the embodiment further includes a generally circular reinforcing cloth 55 (FIG. 8) for reinforcing the periphery 17 of the gas inlet port 18. The reinforcing cloth 55 includes an extended region 55*a* that extends forward from the gas inlet port 18 and which extended region 55*a* covers an inner side of a later-described seam 63 disposed proximate the inlet port 18 and prevents inflation gas fed from the inlet port 18 from directly hitting the seam 63 as shown in FIG. 4. In this specific embodiment, additional reinforcing cloths 56 are applied to the vent holes 20, too.

In this embodiment, the left outer panel 30, right outer panel 40, left inner panel 49L, right inner panel 49R, reinforcing cloths 55, 56 and the materials 26L and 26R for forming the flow regulating cloth 25 are made of flexible fabric of polyester, polyamide or the like and which fabric is not coated by such coating agents as silicone.

Figure 9A:
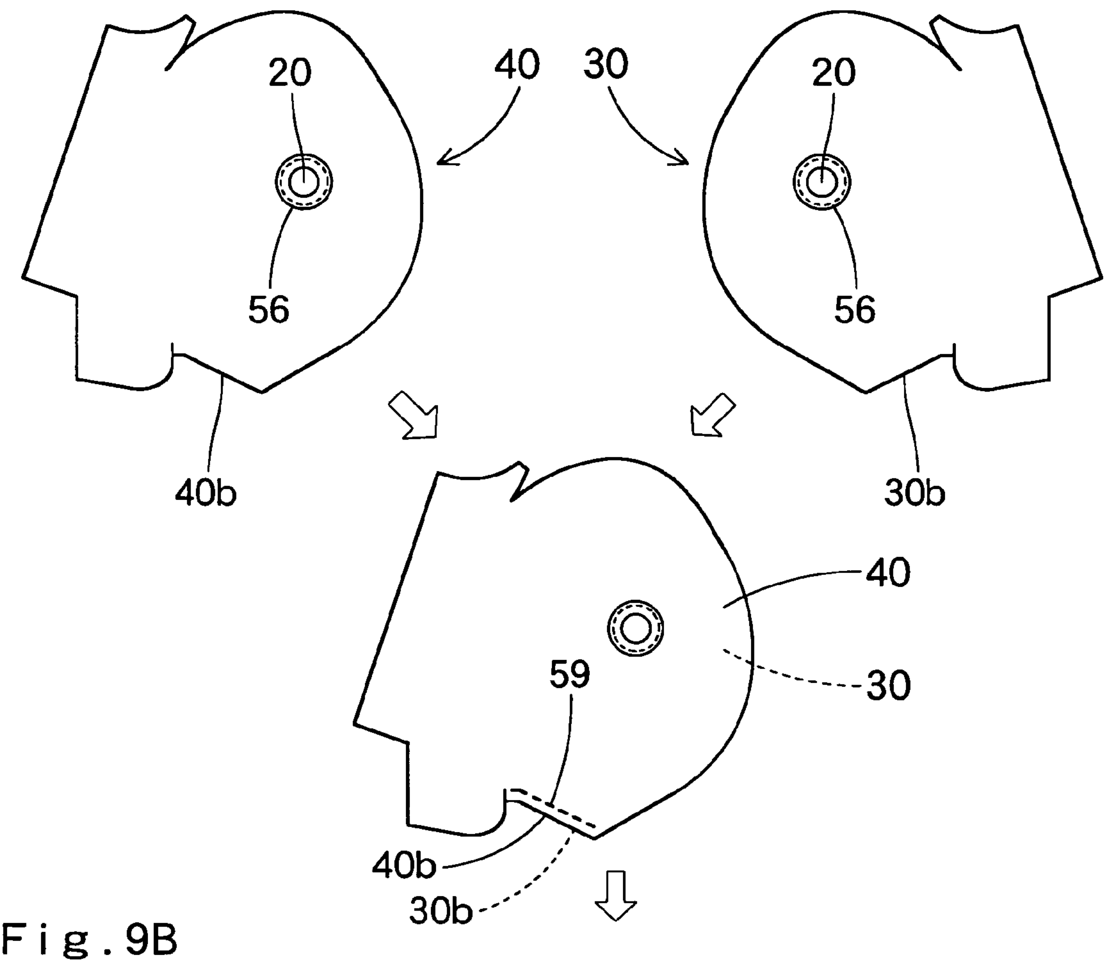
Figure 9B:
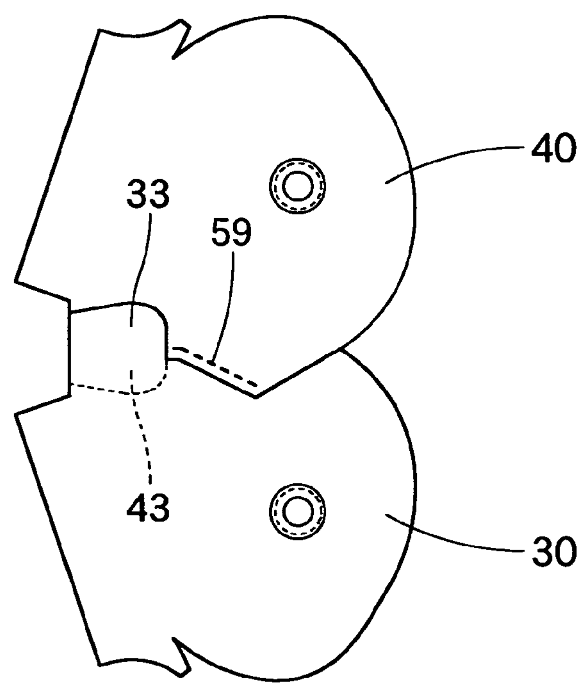
Figure 10A:
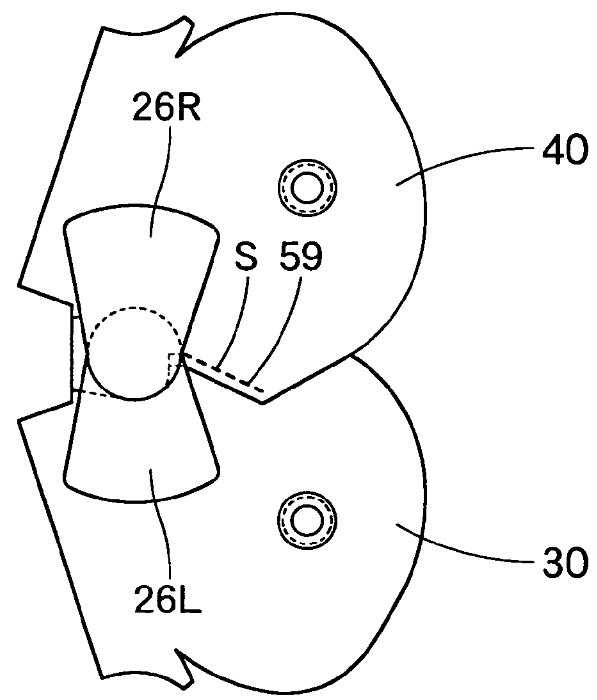
Figure 10B:
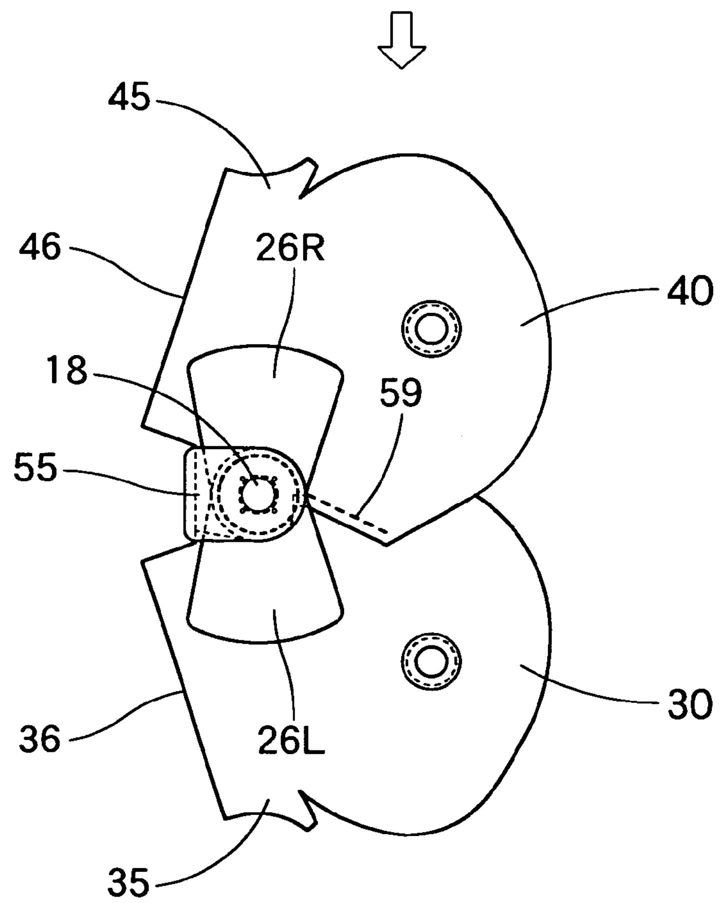
Figure 11A:
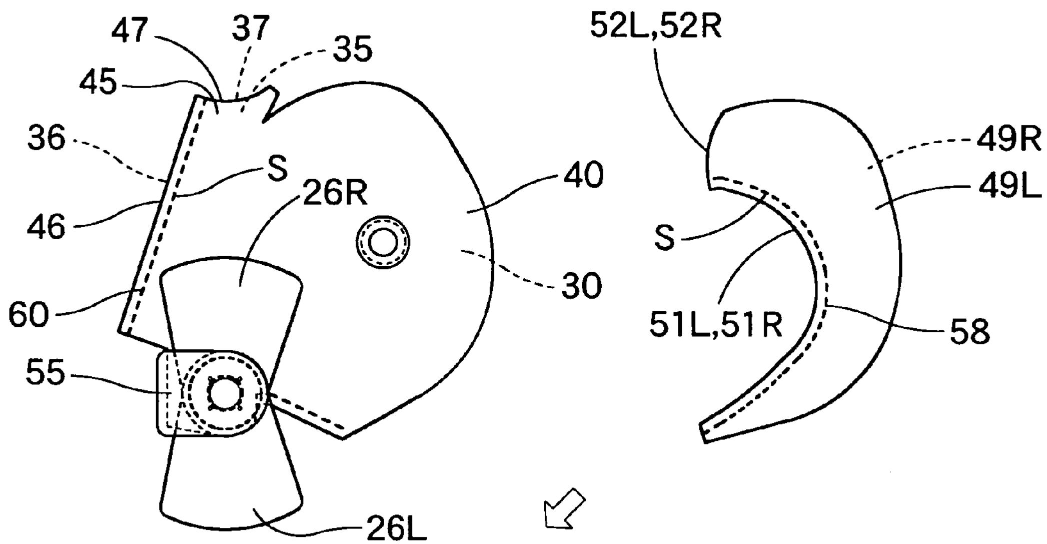

Manufacturing of the airbag 15 is now described. Firstly, the left inner panel 49L and right inner panel 49R are flattened and superimposed one on the other so that their circumferential edges match each other, and then the inner circumferential edges 51L and 51R are sewn up with sewing yarn S to form an inner seam 58 as shown in FIG. 11A. In this specific embodiment, the inner seam 58 is formed by chain stitch. The reinforcing cloths 56 are sewn to circumferences of the vent holes 20 on the outer panels 30 and 40. Then as shown in FIG. 9A, the left outer panel 30 and right outer panel 40 are flattened and superimposed one on the other so that their circumferential edges match each other, and then lower edges 30*b* and 40*b* are sewn up with sewing yarn S to form a seam 59. Subsequently, as shown in FIG. 9B, the outer panels 30 and 40 are opened with the seam 59 disposed inside and projecting regions 33 and 43 overlaid one on the other such that the central extended regions 35 and 45 are separated away from each other, and the materials 26L and 26R of the flow regulating cloth 25 and the reinforcing cloth 55 are superimposed on the projecting regions 33 and 34 in that order as shown in FIGS. 10A and 10B, and then sewn to the projecting regions 33 and 43 along and proximate the gas inlet port 18 and along the periphery of the joint portions 27 of the materials 26L and 26R with the sewing yarn S. Thereafter, punching work is applied to form the gas inlet port 18 and the mounting holes 19.

Figure 11B:
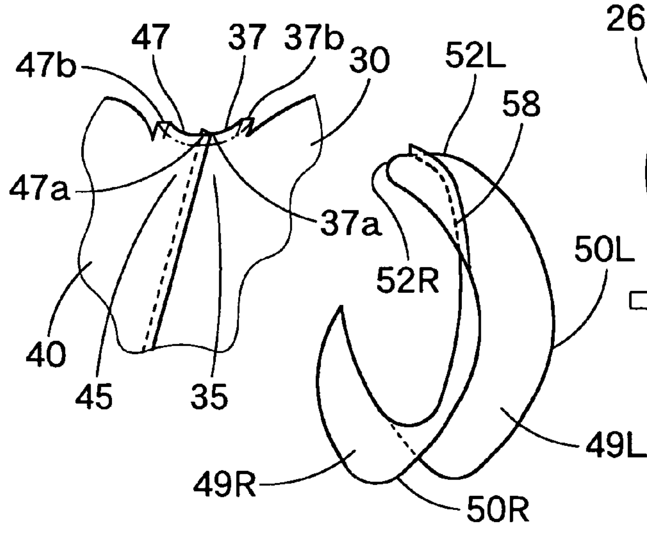
Figure 11C:
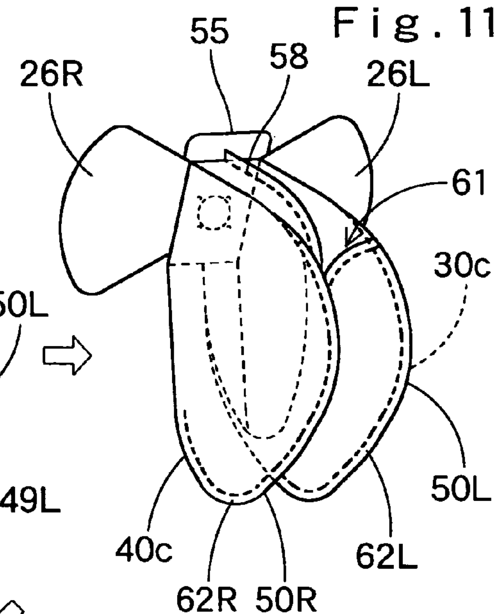

Subsequently, the left outer panel 30 and right outer panel 40 are again superimposed one on the other so that their circumferential edges match each other as shown in FIG. 11A, and the front upper edges 36 and 46 of the central extended regions 35 and 45 are sewn up together with the sewing yarn S to form the seam 60. In this embodiment, the seam 60 is formed by chain stitch as well. Thereafter, the left outer panel 30 and right outer panel 40 are again opened so that the rear upper edges 37 and 47 of the central extended regions 35 and 45 are separated away from each other. In the meantime, the left inner panel 49L and right inner panel 49R are opened as well in such a manner as to separate the crossing edges 52L and 52R, and then the crossing edges 52L and 52R are applied on the rear upper edges 37 and 47 of the central extended regions 35 and 45 and sewn thereto by the sewing yarn S to form the crossing seam 61 as shown in FIG. 11B. Subsequently, as shown in FIG. 11C, the rear edge 30*c* (FIG. 8) of the left outer panel 30 and the outer edge 50L of the left inner panel 49L are sewn up by the sewing yarn S to form an outer seam 62L whereas the rear edge 40*c* of the right outer panel 40 and the outer edge 50R of the right inner panel 49R are sewn up likewise to form an outer seam 62R. The outer seams 62L and 62R extend into the upper side wall 15*a* as shown in FIGS. 2 and 6 while sewing up circumferential edges of the central extended regions 35 and 45 and circumferential edges of the left region 31 and right region 41 of the outer panels 30 and 40 around the slits 38*a* and 48*a* as well to form the darts 38 and 48.

Figure 11D:
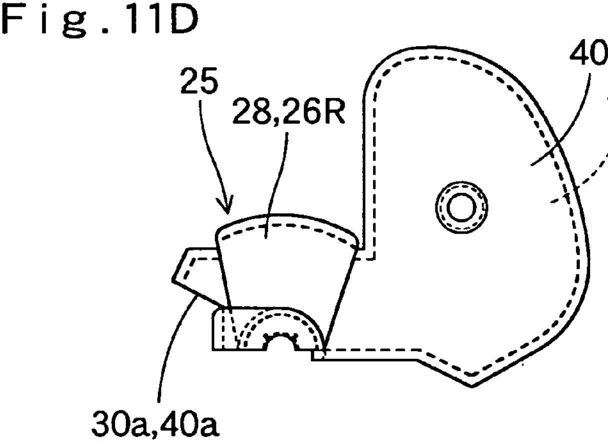
Figure 11E:
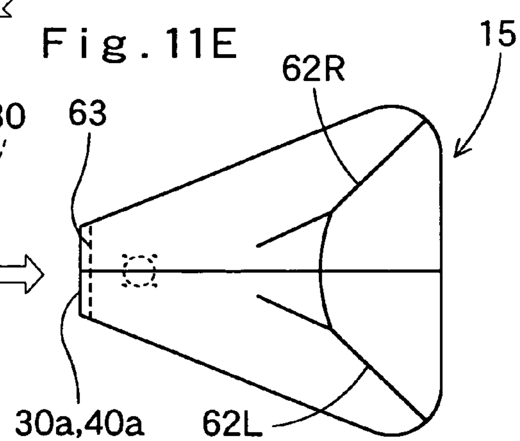

Thereafter, as shown in FIG. 11D, the main bodies 28 of the materials 26L and 26R are sewn up at their ends to complete the flow regulating cloth 25. Subsequently, the airbag 15 is reversed inside out utilizing unsewn regions of the left and right outer panels 30 and 40 (i.e. front edges 30*a* and 40*a*) so that seam allowances of circumferential edges may not appear on outside, and the front edges 30*a* and 40*a* of the left and right outer panels 30 and 40 are respectively sewn up to form a seam 63 as shown in FIG. 11E. Thus the airbag 15 is completed. In this specific embodiment, the inner seam 58 and the seam 60 are formed by chain stitch whereas the seams 59, 63, the crossing seam 61 and the outer seams 62L and 62R are formed by lockstitch that is usually used for manufacturing of an airbag.

After manufacturing the airbag 15, the retainer 11 is placed inside the airbag 15 so that the bolts 11*a* project from the mounting holes 19, and then the airbag 15 is folded up in that state. The folded-up airbag 15 is wrapped up by a breakable wrapping sheet 13 (FIG. 1) to keep the folded-up configuration. Then the airbag 15 is placed on the bottom wall 6*a* of the case 6 while putting the bolts 11*a* through the bottom wall 6*a*. Subsequently, the body 8*a* of the inflator 8 is set in the case 6 from the lower side of the bottom wall 6*a* while the bolts 11*a* protruded downward from the bottom wall 6*a* are inserted through the flange 8*c* of the inflator 8. Thereafter, by fastening the bolts 11*a* protruded from the flange 8*c* of the inflator 8 into nuts 12, the airbag 15 and inflator 8 are attached to the bottom wall 6*a* of the case 6.

Then if the circumferential wall 6*b* of the case 6 is attached to the joint wall 10*c* of the airbag cover 10 in the dashboard 1 which has been mounted on vehicle, and the unillustrated brackets of the case 6 are fixed to predetermined positions of vehicle body, the airbag apparatus M for a front passenger's seat is mounted on vehicle.

After mounting the airbag apparatus M on vehicle, in the event of a frontal collision of vehicle, inflation gas is discharged from the gas discharge ports 8*b* of the inflator 8 to inflate the airbag 15. The airbag 15 inflates and breaks the wrapping sheet 13, then pushes and opens the doors 10*a* and 10*b* of the airbag cover 10 as shown in FIGS. 1 and 14. Then the airbag 15 emerges from an opening provided by the opening of the doors 10*a* and 10*b* and deploys upward and rearward and stuffs the space between the top plane 2 of the dashboard 1 and the windshield 4 as shown in FIGS. 1, 13 and 14.

In the airbag 15, the left and right outer panels 30 and 40 that are located on the left and right sides of the inflated airbag 15 are configured as laterally symmetrical separate entities. Each of the outer panel 30 and 40 includes at the top the central extended region 35/45 that is adapted to be located proximate the lateral center of the inflated airbag 15. Each of the central extended regions 35 and 45 includes at the rear end the rear upper edge or the joint edge 37/47 for joint with the crossing edge 52L/52R of the left/right inner panel 49L/49R. Further, the central extended regions 35 and 45 are coupled to each other at the upper front edges 36 and 46 except the rear upper edges 37 and 47. Conceptually, the outer panels 30 and 40 and inner panels 49L and 49R of the airbag 15 have such configurations that a portion of a conventional right inner panel 49R' (left inner panel 49L') as indicated by double-dashed lines in FIG. 12 is cut out at the location of the crossing edge 52R (52L) and then the cut-out portion, i.e. a portion adapted to be located forward relative to the crossing edge 52R (52L) at airbag inflation, is attached to the right outer panel 40 (left outer panel 30) as the central extended region 45 (35). For this reason, the inner panels 49L and 49R of this embodiment have a smaller anteroposterior width W1 (FIG. 12) in comparison with the width W0 of the conventional inner panels 49L' and 49R', with less curvature, in other words, with shallower dents at the inner circumferences. Coupled with the left and right outer panels 30 and 40 provided as separate entities, sizes of respective base cloths for composing the airbag 15 are reduced relative to conventional airbags, and therefore, the yield will be improved in manufacturing of the airbag.

In the airbag 15, the inner panels 49L and 49R are not simply reduced in the anteroposterior width, but the central extended regions 35 and 45 disposed on the outer panels 30 and 40 replace or substitute the conceptually cut-out regions of the inner panels in the conventional airbags. This configuration does not reduce the depth of the recess 23 or the rise of the raised regions 22L and 22R at the upper end 15*ea* of the rear side wall 15*e* where the central extended regions 35 and 45 are located at full inflation of the airbag 15.

More specifically, the central extended regions 35 and 45 are located on the upper periphery of the left and right outer panels 30 and 40 in this embodiment. As shown in FIG. 4, the seam 60 that joins the front upper edges 36 and 46 of the central extended regions 35 and 45 continues from the inner joint 58 and extends forward on the upper side wall 15*a*. That is, the joint 60 forms the leading end 23*a* of the recess 23 as well as the inner seam or inner joint 58 while reducing the depth of the recess as it proceeds forward. Accordingly, the depth of the recess 23 is not reduced upon deployment at the upper end 15*ea* of the rear side wall 15*e*, i.e. of the rear area of the airbag 15. When a passenger MP bumps against the airbag 15 having a marked unevenness of the raised regions 22L and 22R and the recess 23 at the upper end 15*ea* of the rear side wall 15*e*, the left and right raised regions 22L and 22R firstly receive the vicinities of left and right shoulders MSL and MSR of the passenger MP and there by reducing a forward kinetic energy of the passenger MP. Then a head MH of the passenger MP enters into the recess 23 with the shoulders MSL and MSR restrained by the raised regions 22L and 22R, and then is arrested and suppressed from moving forward. That is, the airbag 15 receives the head MH of the-passenger MP softly without applying much reaction force in such condition that the kinetic energy of the passenger MP has been preliminarily reduced by the raised regions 22L and 22R.

Moreover, the upper end 58*a* of the inner seam or inner joint 58 that forms the leading end 23*a* of the recess 23 falls on the crossing seam 61, i.e. on the crossing edges 52L and 52R. This configuration locates the upper end 58*a* of the inner joint 58 at a remote position from the gas inlet port 18 in a direction the airbag 15 deploys, i.e. in the vertical direction or anteroposterior direction in comparison with conventional airbags, and therefore, the end 58*a* of the inner seam 58 is less affected by the tension force that acts on the periphery of the gas inlet port 18 along the deployment direction of the airbag 15 in the initial stage of airbag inflation, thereby preventing a stress concentration on the end 58*a* of the inner seam 58. This configuration will lessen or eliminate the need for a separate reinforcing cloth which would otherwise have to be applied to that location.

Therefore, the airbag 15 embodying the present invention conduces to yield improvement and reduces stress concentration while securing a steady recessed contour of the recess 23 so that it is capable of protecting a passenger MP smoothly.

In the airbag 15, the crossing edges 52L and 52R of the left and right inner panels 49L and 49R are configured such that the middle end 52*a* on the side of the inner edge 51L/51R is displaced forward on the inflated airbag 15 relative to the side end 52*b* on the side of the outer edge 50L/50R. Accordingly, the crossing seam or crossing joint 61 that is formed by joining the crossing edges 52L, 52R and corresponding rear upper edges or joint edges 37, 47 of the central extended regions 35 and 45 of the outer panels 30 and 40 is so configured, as shown in FIGS. 4 and 6, that the lateral center 61*a* is displaced forward relative to the left and right ends 61*b* by a distance DL (FIG. 4) while extending generally widthwise in a gently curved continuous manner. This configuration helps prevent a lateral tension force that works on intersections of the crossing seam 61 and outer seams or outer joints 62L and 62R, i.e. on the left and right ends 61*b* of the crossing seam 61 upon airbag inflation from directly acting on an intersection of the crossing seam 61 and inner seam 58, i.e. the end 58*a* of the inner seam 58. As a result, the stress which would otherwise be applied on the end 58*a* of the inner seam 58 is further reduced, which will lessen or eliminate the need for a separate reinforcing cloth which would otherwise have to be applied to that location. Although the crossing seam 61 is so curved as to put the lateral center to the front in this embodiment, the lateral center of the crossing seam may be displaced rearward relative to the left and right ends like a crossing seam 61' indicated by a double-dashed line in FIG. 6. Without considering the advantage described above, the crossing seam may alternatively be configured to extend straightly width wise on the inflated airbag as airbags 15A or 15B described below.

Moreover, the inner joint 58 of the airbag 15 that sews up the inner circumferential edges 51L and 51R of the left and right inner panels 49L and 49R is formed by chain stitch. Since chain stitch is easy to stretch relative to lockstitch that is usually used to manufacture an airbag, the stress applied to the vicinity of the inner seam 58 is alleviated at airbag inflation, which makes it possible to omit reinforcing cloths that have been used to reinforce the inner seam 58. In addition, the seam 60 that continues from the inner seam 58 and forms the leading end 23*a* of the recess 23 on the upper side wall 15*a* coupled with the inner seam 58 is formed by chain stitch as well. This configuration increases an area formed by chain stitch and conduces to reduction of the stress applied on the seam 60 and inner seam 58 in operation.

An alternative embodiment of the airbag is now described. In an airbag 15A shown in FIGS. 15 and 16, the left outer panel 77L and right outer panel 77R each have a central extended region 78L/78R at the lower periphery. Accordingly, the left inner panel 80L and right inner panel 80R each have a crossing edge 81L/81R at the lower front end for joint with a joint edge 79L/79R of the central extended region 78L/78R. As shown in FIG. 17, the airbag 15A has a similar structure to the aforementioned airbag 15 except in outer contours of the outer panels 77L, 77R, inner panels 80L, 80R and a contour at full inflation. Therefore, detailed descriptions of common members and parts will be omitted by adding a symbol "A" to reference numerals of such members and parts. In the airbag 15A, the crossing edges 81L and 81R of the left and right inner panels 80L and 80R and joint edges 79L and 79R of the central extended regions 78L and 78R are configured generally straight such that the crossing seam 61A that sews up the crossing edges 81L, 81R and joint edges 79L and 79R together extends generally straightly widthwise on the inflated airbag 15A as shown in FIG. 16. In operation, the airbag 15A inflates with a lateral center of the bottom of its rear side deeply recessed. Accordingly, in the event that the airbag 15A deploys toward a front passenger's seat that is equipped with a child seat mounted to face rearward, a head rest part of the child seat located proximate the dashboard enters in between the recess 23A and the dashboard, so that the inflated airbag 15A is prevented from engaging the child seat as much as possible. In the event that not only a child seat but also other objects are placed proximate the dashboard, too, the airbag 15A is prevented from engaging those objects as much as possible upon deployment.

Further additional embodiment is now described referring to FIGS. 18 to 20. In an airbag 15B shown in FIGS. 18 and 19, the left outer panel 84L and right outer panel 84R each have central extended regions both on the upper periphery and lower periphery as indicated at 85UL, 85UR, 85DL and 85DR in FIG. 20. Accordingly, the left inner panel 87L and right inner panel 87R each have a crossing edge 88UL/88UR at the upper front end for joint with a joint edge 86UL/86UR of the central extended region 85UL/85UR and a crossing edge 88DL/88DR at the lower front end for joint with a joint edge 86DL/86DR of the central extended region 85DL/85DR. The airbag 15B has a similar structure to the aforementioned airbag 15 except in outer contours of the outer panels 84L, 84R, inner panels 87L, 87R and a contour at full inflation. Therefore, detailed descriptions of common members and parts will be omitted by adding a symbol "B" to reference numerals of such members and parts. In the airbag 15B, the crossing edges 88UL, 88UR, 88DL and 88DR of the left and right inner panels 87L and 87R and joint edges 86UL, 86UR, 86DL and 86DR of the central extended regions 85UL, 85UR, 85DL and 85DR are configured generally straight such that the crossing seams 61BU and 61BD that sew up the crossing edges 88UL, 88UR, 88DL and 88DR and corresponding joint edges 86UL, 86UR, 86DL and 86DR together extend generally straightly widthwise on the inflated airbag 15B as shown in FIG. 19. In operation, the airbag 15B configured as above inflates with lateral centers of the top and bottom regions of its rear side deeply recessed, and therefore receives a passenger's head softly without applying undue reaction force and avoids undue contact with such objects as a child seat located proximate the dashboard.

Although the airbags 15, 15A and 15B of the foregoing embodiments are manufactured by sewing up circumferential edges of the outer panels and inner panels with sewing yarn S, means for coupling the base cloths should not be limited thereby. For example, the airbag may be manufactured by joining the base cloths with adhesive or the like.

What it claimed is:

1. An airbag for a front passenger's seat for a motor vehicle adapted to be folded up and stored in a housing on a top area of an instrument panel in front of the front passenger's seat for deployment upward and rearward when fed with inflation gas in such a manner as to fill in a space between a top plane of the instrument panel and a windshield disposed above the instrument panel, the airbag having a generally square conical contour at inflation whose front end is the top of the square cone and comprising:

- a gas inlet port for introducing inflation gas, at the vicinity of a lateral center of a front end of a lower side of the airbag at full inflation;
- a peripheral area of the gas inlet port acting as a mounting area of the airbag to the housing;
- two raised regions disposed side by side at least on a rear side of the airbag at full inflation, each of the raised regions extending generally vertically in such a manner as to rise rearward;
- a recess that recesses forward between the raised regions and extends generally vertically;
- a pair of left and right outer panels located on laterals of the inflated airbag, the left and right outer panels being configured as laterally symmetric separate entities;
- a pair of left and right inner panels located on an inner area in a transverse direction of the inflated airbag, each of the inner panels having a band contour curved in a generally C-shape as is flattened;
- a pair of outer joints that join each of outer circumferences of the left inner panel and right inner panel and each corresponding outer circumference of the left outer panel and right outer panel, the outer joints forming tops of the raised regions; and
- an inner joint that joins inner circumferences of the left inner panel and right inner panel and forms a leading end of the recess,
- wherein each of the inner panels includes at least on one of upper or lower front edges thereof a crossing edge that extends in a transverse direction on the inflated airbag and links the inner joint and outer joints;
- wherein each of the outer panels includes, at least at an upper periphery or lower periphery thereof, a central extended region that is located proximate the lateral center of the inflated airbag for joint with the crossing edge of each of the inner panels; and
- wherein each of the central extended regions includes a joint edge for joint with the crossing edge of each of the inner panels and the central extended regions are coupled to each other at outer circumferences thereof except the joint edges.

2. The airbag for a front passenger's seat according to claim 1, wherein the central extended region is disposed on the upper periphery of each of the left and right outer panels.

3. The airbag for a front passenger's seat according to claim 1, wherein the central extended region is disposed on the lower periphery of each of the left and right outer panels.

4. The airbag for a front passenger's seat according to claim 1, wherein the central extended region is disposed both on the upper periphery and lower periphery of each of the left and right outer panels.

5. The airbag for a front passenger's seat according to claim 1, wherein:

- first ends of the crossing edges of the left and right inner panels located proximate the lateral center of the inflated airbag are displaced to the front or rear relative to second ends of the crossing edges facing away from the lateral center of the inflated airbag; and
- a crossing joint that joins the crossing edges and the joint edges of the central extended regions of the outer panels together extends generally in a transverse direction on the inflated airbag in a gently curved continuous manner.

6. The airbag for a front passenger's seat according to claim 1, wherein the left outer panel, right outer panel, left inner panel and right inner panel are joined together by sewing and the inner joint is formed by chain stitch.

7. The airbag for a front passenger's seat according to claim 6, wherein a seam that sews up upper front peripheries or lower front peripheries of the central extended regions of the outer panels and extends continuously from the inner joint is formed by chain stitch.

* * * * *